[12] United States Patent
Pinsonneault et al.

(10) Patent No.: US 11,562,438 B1
(45) Date of Patent: *Jan. 24, 2023

(54) SYSTEMS AND METHODS FOR AUDITING DISCOUNT CARD-BASED HEALTHCARE PURCHASES

(71) Applicant: McKesson Corporation, Irving, TX (US)

(72) Inventors: Roger G. Pinsonneault, Alpharetta, GA (US); Patrick I. Harris, Sr., Atlanta, GA (US)

(73) Assignee: McKesson Corporation, Irving, TX (US)

( * ) Notice: Subject to any disclaimer, the term of this patent is extended or adjusted under 35 U.S.C. 154(b) by 468 days.

This patent is subject to a terminal disclaimer.

(21) Appl. No.: 16/737,131

(22) Filed: Jan. 8, 2020

Related U.S. Application Data

(63) Continuation of application No. 14/811,392, filed on Jul. 28, 2015, now Pat. No. 10,565,656.

(51) Int. Cl.
*G06Q 40/08* (2012.01)
*G06Q 30/02* (2012.01)
*G06Q 50/22* (2018.01)

(52) U.S. Cl.
CPC ......... *G06Q 40/08* (2013.01); *G06Q 30/0207* (2013.01); *G06Q 50/22* (2013.01)

(58) Field of Classification Search
CPC ..... G06Q 40/08; G06Q 30/0207; G06Q 50/22
See application file for complete search history.

(56) References Cited

U.S. PATENT DOCUMENTS 5,060,379 A   10/1991   Neely
5,550,734 A   8/1996    Tarter et al.
(Continued)

FOREIGN PATENT DOCUMENTS

CA       2482370        3/2006
WO   WO 1995/003569    2/1995
(Continued)

OTHER PUBLICATIONS

U.S. Appl. No. 14/811,392, filed Jul. 28, 2015, U.S. Pat. No. 10,565,656, Issued.
(Continued)

*Primary Examiner* — Robert A Sorey
(74) *Attorney, Agent, or Firm* — Alston & Bird LLP

(57) ABSTRACT

An adjudicated prescription claim transaction response is received and includes a total amount paid by the claims processor, a patient pay amount, and the pharmacy's Usual and Customary Charge amount for a product/service. The adjudicated response can be evaluated to determine it was approved/paid and the total amount paid by the claims processor is zero or less. An income audit evaluation may be conducted by comparing the patient pay amount to the Usual and Customary Charge amount. Based on the Usual and Customary Charge amount being less than or less than or equal to the patient pay amount, a reversal transaction can be generated and transmitted to a claims processor computer for adjudication. Further, the adjudicated prescription claim transaction response can be converted from an approved/paid response to (or replaced by) a rejected adjudicated prescription claim transaction response and transmitted to the pharmacy computer that initiated the prescription claim transaction.

16 Claims, 7 Drawing Sheets

(56) References Cited

U.S. PATENT DOCUMENTS

| | | | |
|---|---|---|---|
| 5,628,530 | A | 5/1997 | Thornton |
| 6,012,035 | A | 1/2000 | Freeman, Jr. et al. |
| 6,208,973 | B1 | 3/2001 | Boyer et al. |
| 6,757,898 | B1 | 6/2004 | Ilsen et al. |
| 6,769,228 | B1 | 8/2004 | Mahar |
| 7,155,397 | B2 | 12/2006 | Alexander et al. |
| 7,734,483 | B1 | 6/2010 | Smith et al. |
| 8,036,913 | B1 | 10/2011 | Pinsonneault et al. |
| 8,036,918 | B1 | 10/2011 | Pinsonneault |
| 8,060,379 | B1 | 11/2011 | Pinsonneault et al. |
| 8,321,283 | B2 | 1/2012 | Rowe et al. |
| 8,326,773 | B1 | 12/2012 | Bellamy et al. |
| 8,392,209 | B1 | 3/2013 | Berth et al. |
| 8,630,873 | B1 | 1/2014 | Wiley, II et al. |
| 8,639,523 | B1 | 1/2014 | Pinsonneault |
| 8,671,018 | B2 | 3/2014 | Thomas et al. |
| 9,373,065 | B1 | 6/2016 | Hoffman |
| 2001/0023415 | A1 | 9/2001 | Keil |
| 2002/0002495 | A1 | 1/2002 | Ullman |
| 2002/0087583 | A1 | 7/2002 | Morgan et al. |
| 2002/0095314 | A1 | 7/2002 | Bodsworth et al. |
| 2002/0111832 | A1 | 8/2002 | Judge |
| 2002/0198831 | A1 | 12/2002 | Patricelli et al. |
| 2003/0009367 | A1 | 1/2003 | Morrison |
| 2003/0050799 | A1 | 3/2003 | Jay et al. |
| 2003/0149594 | A1 | 8/2003 | Beazley et al. |
| 2003/0149625 | A1 | 8/2003 | Leonardi |
| 2003/0154163 | A1 | 8/2003 | Phillips et al. |
| 2003/0229540 | A1 | 12/2003 | Algiene |
| 2003/0236747 | A1 | 12/2003 | Sager |
| 2004/0039599 | A1 | 2/2004 | Fralic |
| 2004/0039691 | A1 | 2/2004 | Barrat et al. |
| 2004/0059600 | A1 | 3/2004 | Ball et al. |
| 2004/0073457 | A1 | 4/2004 | Kalies |
| 2004/0078234 | A1 | 4/2004 | Tallal, Jr. |
| 2004/0117323 | A1 | 6/2004 | Mindala |
| 2004/0139008 | A1 | 7/2004 | Mascavage, III |
| 2004/0148198 | A1 | 7/2004 | Kalies |
| 2004/0249745 | A1 | 12/2004 | Baaren |
| 2005/0015280 | A1 | 1/2005 | Gabel et al. |
| 2005/0060201 | A1 | 3/2005 | Connely, III et al. |
| 2005/0102169 | A1 | 5/2005 | Wilson |
| 2005/0108067 | A1 | 5/2005 | Chapman et al. |
| 2005/0154627 | A1 | 7/2005 | Zuzek et al. |
| 2005/0187793 | A1 | 8/2005 | Myles |
| 2005/0197862 | A1 | 9/2005 | Paterson et al. |
| 2005/0240473 | A1 | 10/2005 | Ayers, Jr. et al. |
| 2005/0288972 | A1 | 12/2005 | Marvin et al. |
| 2006/0026041 | A1 | 2/2006 | Ullman |
| 2006/0036470 | A1 | 2/2006 | Oaks |
| 2006/0020514 | A1 | 3/2006 | Yered |
| 2006/0149595 | A1 | 7/2006 | Williams et al. |
| 2006/0149784 | A1 | 7/2006 | Tholl et al. |
| 2006/0184391 | A1 | 8/2006 | Barre et al. |
| 2006/0206425 | A1 | 9/2006 | Sharma |
| 2006/0212318 | A1 | 9/2006 | Dooley et al. |
| 2006/0259363 | A1 | 11/2006 | Jhetam et al. |
| 2007/0005402 | A1 | 1/2007 | Kennedy et al. |
| 2007/0050209 | A1 | 3/2007 | Yered |
| 2007/0136100 | A1 | 6/2007 | Daugherty et al. |
| 2007/0162303 | A1 | 7/2007 | Wiley et al. |
| 2007/0192206 | A1 | 8/2007 | Manesh et al. |
| 2007/0203750 | A1 | 8/2007 | Volcheck |
| 2007/0226009 | A1 | 9/2007 | Hicks |
| 2007/0233525 | A1 | 10/2007 | Boyle |
| 2007/0233526 | A1 | 10/2007 | Hoffman et al. |
| 2007/0239493 | A1 | 10/2007 | Sweetland et al. |
| 2007/0265887 | A1 | 11/2007 | McLaughlin et al. |
| 2008/0097944 | A1 | 4/2008 | Kelly et al. |
| 2008/0183492 | A1 | 7/2008 | Warren et al. |
| 2008/0215370 | A1 | 9/2008 | Dent et al. |
| 2009/0048864 | A1 | 2/2009 | Kozlowski et al. |
| 2009/0055225 | A1 | 2/2009 | Russell |
| 2009/0210286 | A1 | 8/2009 | Bisdikian |
| 2009/0313039 | A1 | 12/2009 | Cedergreen |
| 2010/0057640 | A1 | 3/2010 | Cannata |
| 2010/0241458 | A1 | 9/2010 | Hasan |
| 2012/0035952 | A1 | 2/2012 | Coyne |
| 2012/0253846 | A1 | 10/2012 | John et al. |
| 2013/0311389 | A1 | 11/2013 | Kaehler et al. |
| 2014/0039911 | A1 | 2/2014 | Iyer |
| 2015/0006198 | A1 | 1/2015 | Furr et al. |
| 2015/0220690 | A1 | 8/2015 | Kahlon |
| 2015/0234991 | A1 | 8/2015 | Pinsonneault |
| 2015/0269695 | A1 | 9/2015 | Pinsonneault et al. |
| 2016/0027136 | A1 | 1/2016 | Taketomo |
| 2018/0018647 | A1 | 1/2018 | Fredman et al. |

FOREIGN PATENT DOCUMENTS

| | | |
|---|---|---|
| WO | WO 2000/039737 | 7/2000 |
| WO | WO 2007/025295 | 3/2007 |

OTHER PUBLICATIONS

Abrams, Lawrene W. "Pharmacy Benefit Managers as Bargaining Agents", Paper presented at the Western Economic Association International, 80th Annual Conference Jul. 6, 2005 Ssan Franciso, the Dec. 10, 2005 entry accessed at http://web.archive.org/web/2005129093448/http:/7www.nu-retail.com/pbm_bargaining_paper.pdf on Aug. 23, 2011.

Advisory Action for U.S. Appl. No. 14/466,995 dated Apr. 19, 2018.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Anonymous, Medic; On-line Goes In-I-louse, Chain Store Age Executive, Jan. 1987, vol. 63, Issue 1, USA; Abstract only.

Anonymous, Pharmacy Industry Leaders Launch Firm to Supply Real-Time Data. PR Newswire. Jul. 30, 2001, p. 1 New York, NY, USA.

Anonymous, TechRx Announces Successful Beta Deployment of T-Rex. PR Newswire. May 13, 2002.

Final Office Action for U.S. Appl. No. 12/101,997 dated May 9, 2011.

Final Office Action for U.S. Appl. No. 12/143,548 dated Jan. 19, 2011.

Final Office Action for U.S. Appl. No. 14/173,200 dated Jun. 13, 2016.

Lamb, J., New Era of Electronic Medicine Management: E-Prescriptions, Britain's Traditionally Cautious National-Iealth Service is Starting Trials for Online Prescription, with the Aim of Cutting Costs. Financial Times, London, Feb. 21, 2001, p. 6, London, United Kingdom.

Non-final Office Action for U.S. Appl. No. 12/101,997 dated Dec. 6, 2010.

Non-Final Office Action for U.S. Appl. No. 12/143,548 dated Aug. 4, 2010.

Non-final office Action for U.S. Appl. No. 14/173,200 dated Dec. 11, 2015.

Notice of Allowance for U.S. Appl. No. 12/101,997 dated Jul. 11, 2019.

Notice of Allowance for U.S. Appl. No. 12/101,997 dated Sep. 1, 2011.

Office Action for U.S. Appl. No. 14/466,995 dated Dec. 29, 2017.
Office Action for U.S. Appl. No. 14/466,995 dated Jun. 2, 2017.
Office Action for U.S. Appl. No. 14/811,392 dated Oct. 10, 2018.
Office Action for U.S. Appl. No. 14/811,392 dated Apr. 24, 2019.
Office Action for U.S. Appl. No. 14/811,392 dated Nov. 8, 2018.
Sampson,1 R.J., Taking Control of Health Care Costs, Best's Review—Life Health Insurance Edition, Nov. 1983, vol. 84, Issue 7, USA; Abstract only.

SYSTEMS AND METHODS FOR AUDITING DISCOUNT CARD-BASED HEALTHCARE PURCHASES

CROSS REFERENCE TO RELATED APPLICATION

This application is a continuation of and claims priority to U.S. application Ser. No. 14/811,392, filed Jul. 28, 2015, and titled, "SYSTEMS AND METHODS FOR AUDITING DISCOUNT CARD-BASED HEALTHCARE PURCHASES," the entire contents of which are hereby incorporated by reference.

TECHNICAL FIELD

Aspects of the disclosure relate generally to auditing discount card-based healthcare purchases, and more particularly, to systems and methods for auditing discount card-based purchases by comparing information in healthcare claim transactions to determine more beneficial income/profitability for pharmacies and/or cost savings for patients.

BACKGROUND

A healthcare provider, such as a pharmacy, pharmacist, doctor's office, urgent care center, physician, hospital, or the like provides numerous healthcare related products and services to patients, including providing prescription products (e.g., medications, devices, etc.) or services to a patient. Typically, a healthcare claim transaction, such as a prescription claim transaction, prescription billing request, or medical claim transaction, is generated by the healthcare provider and sent, either directly or indirectly, to a claims processor (e.g., a pharmacy claims processor) for adjudication. In some cases, the healthcare claim transaction is sent to a claims processor (e.g., a pharmacy claims processor) by way of an intermediary such as a service provider or switch. The healthcare claim transaction typically includes information that identifies the patient, the prescribed product (e.g., medications, devices, etc.) or service being requested, the healthcare provider (either the prescriber, pharmacy, or both), and the benefit plan, insurer, or government-funded payor for the patient.

Prescription discount cards can be provided to patients to aid in procuring a medication, product, or service at a lower out-of-pocket price. There are two primary scenarios in which a prescription discount card is used: (i) "Cash" customers seeking a lower medication price than the standard Usual and Customary Charge for a cash transaction at a pharmacy; and (ii) "Pharmacy benefit" patients (e.g., patients having healthcare insurance coverage for prescription medications) that are seeking a lower price for the desired or prescribed medication, product, or service than the standard Usual and Customary Charge offered by the pharmacy for a cash transaction when the particular medication, product, or service isn't covered (reimbursable) by the patient's insurance provider. The issuer of the discount cards makes money when the card is used.

Pharmacies must balance the opportunity to dispense a prescribed medication, product, or service to a patient against the costs of providing the medication, product, or service. The opportunity cost consideration is specifically difficult for patients using a cash discount card to obtain their prescriptions when the "cash" prescription price (e.g., the patient purchase price or patient pay amount) is equal to the standard Usual and Customary Charge offered by the pharmacy for a cash transaction or less than the standard Usual and Customary Charge amount offered by the pharmacy for a cash transaction plus the card processing fee. In these situations, providing the prescribed medication, product, or service under the reduced discount card based price can result in reduced profits or even a loss for the pharmacy.

BRIEF DESCRIPTION OF THE DRAWINGS

Reference will now be made to the accompanying drawings, which are not necessarily drawn to scale, and wherein.

DETAILED DESCRIPTION OF EXAMPLE EMBODIMENTS

Figure 1:
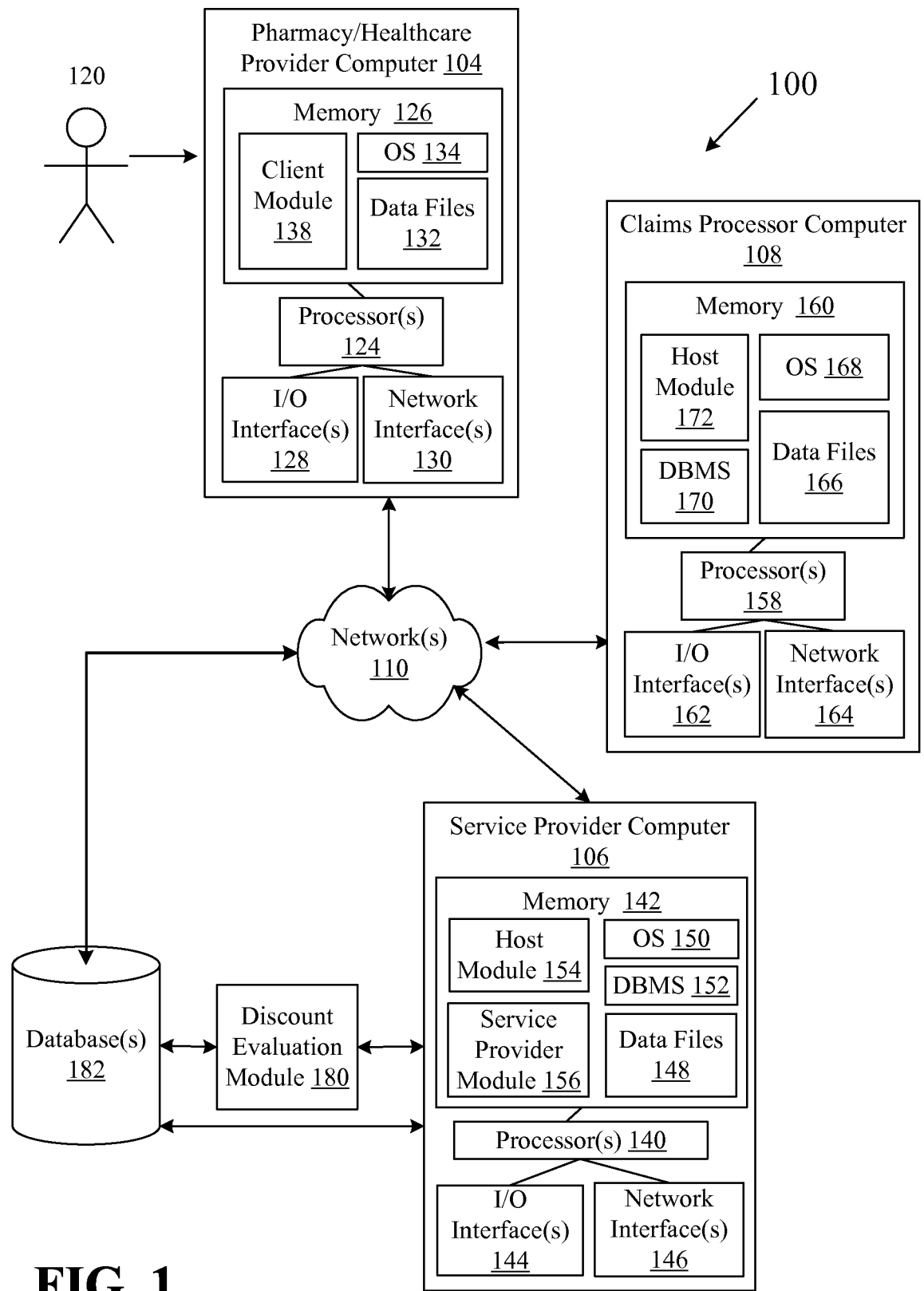
FIG. 1 illustrates an example overview of a system that facilitates the auditing of pharmacy income potential for discount card-based purchases based on an evaluation of the data in the healthcare claim transaction as part of the processing of the healthcare claim transaction according to one exemplary embodiment.

Exemplary embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Example embodiments described herein include systems and methods that facilitate the auditing of pharmacy income potential for discount card-based purchases based on an evaluation of the data in the adjudicated healthcare claim transaction responses as part of or in-line with the processing of one or more types of healthcare claim transactions, such as a prescription claim transaction, prescription billing request, or medical claim transaction, in real-time or near real-time. For example, healthcare claim transactions may be received and evaluated by a service provider prior and/or subsequent to routing or otherwise communicating the healthcare claim transactions to various claims processors (e.g., various pharmacy claims processors). The service provider may determine if the healthcare claim transaction is to receive auditing services either prior to or subsequent to sending the transaction to the claims processor for adjudication. For example, the service provider may evaluate if one or more of the pharmacy, prescribed product (e.g., medication, device, etc.) or service, transaction type, and claims processor are to receive auditing services and accordingly the healthcare claim transaction is to receive the auditing services. The provision of the auditing services may be based at least in part on one or more of the pharmacy contracting to receive auditing services, the medication, product, or service receiving auditing services, the transaction type for the healthcare claim transaction being a type that can receive auditing services, and the claims processor being or being associated with a pharmacy benefits provider that permits auditing services to be provided to its healthcare claim transactions.

The service provider may transmit the healthcare claim transaction to a claims processor (e.g., a pharmacy claims processor) for adjudication and receive back from the claims processor an adjudicated healthcare claim transaction response. The service provider may determine if the transaction was approved/paid and if not, the basis for rejecting the transaction. Based at least in part on the adjudicated healthcare claim transaction response being approved/paid, the service provider can determine, based on information in the adjudicated healthcare claim transaction response, if the total amount paid (e.g., in the Total Amount Paid field of the adjudicated healthcare transaction response) by the claims processor associated with the claims processor computer is zero or less than zero. Based at least in part on the determination that the total amount paid by the claims processor is zero or less than zero, the service provider can determine, based on information in the adjudicated healthcare claim transaction response, if the amount applied to the patient's periodic deductible for this transaction is greater than zero. Based at least in part on the determination that the total amount paid by the claims processor is zero or less than zero and the determination that the amount applied to the patient's periodic deductible for this transaction is not greater than zero, the service provider can identify, based on information in the healthcare claim transaction or the adjudicated healthcare claim transaction response, the patient pay amount and the pharmacy's Usual and Customary Charge for the requested product or service. The service provider can compare the patient pay amount to the amount of the pharmacy's Usual and Customary Charge to determine if the patient pay amount is less than or less than or equal to the amount of the pharmacy's Usual and Customary Charge. Based at least in part on the determination that the patient pay amount is not less than or not less than or equal to the amount of the pharmacy's Usual and Customary Charge, the service provider can generate a reversal transaction to reverse the adjudicated healthcare claim transaction response and can transmit the reversal transaction to the claims processor for adjudication. Further, based at least in part on the determination that the patient pay amount is not less than or not less than or equal to the amount of the pharmacy's Usual and Customary Charge, the service provider can generate a new adjudicated healthcare claim transaction response that is a reject response or can convert the original adjudicated healthcare claim transaction response from an approved/paid response to a reject response and can transmit the converted/generated adjudicated healthcare claim transaction response having a reject response to the pharmacy that initiated the healthcare claim transaction.

System Overview

FIG. 1 illustrates an example system 100 supporting healthcare claim transactions and prescription billing activities according to one example embodiment. The exemplary system 100 facilitates auditing of pharmacy income potential for discount card-based purchases based on an evaluation of the data in the healthcare claim transaction as part of or in-line with the processing of healthcare claim transactions and will now be described illustratively with respect to FIG. 1. As shown in FIG. 1, the system 100 may include at least one pharmacy computer 104, at least one service provider computer 106, a discount evaluation module 180, and at least one claims processor computer 108 (e.g., a pharmacy claims processor computer).

As desired, each of the pharmacy computer 104, service provider computer 106, discount evaluation module 180, and/or claims processor computer 108 may include one or more processing devices that may be configured for accessing and reading associated computer-readable media having stored thereon data and/or computer-executable instructions for implementing the various methods disclosed in the exemplary embodiments discussed herein.

Additionally, in certain exemplary embodiments, the service provider computer 106 and/or the discount evaluation module 180 may be in communication with one or more data storage devices, such as a database 182. The database 182 may receive, store, and provide, as needed, healthcare claim transaction data from the service provider computer 106 and/or the discount evaluation module 180. In certain exemplary embodiments, the healthcare claim transaction data includes all or any portion of the data included in healthcare claim transactions received by the service provider computer 106 from a pharmacy computer 104 and/or adjudicated healthcare claim transaction responses adjudicated by a claims processor computer 108. In addition, the database 182 or another database may include schedules, tables or listings of pharmacies or other healthcare providers receiving auditing or discount card-based purchase services; schedules tables, or listings of medications or other healthcare products for which auditing of discount card-based purchase services are provided; schedules, tables, or listings of transactions codes for transactions that receive auditing of discount card-based purchase services; schedules, tables, or listings of payor identifiers (e.g., Banking Identification Numbers (BIN Numbers), BIN Numbers and Processor Control Numbers (PCN), and/or BIN Number and Group ID) that identify a government payer plan (e.g., the associated claims processor computers for those plans); schedules, tables, or listings of payor identifiers that identify payer plans that are excluded or included to receive auditing of discount card-based purchase services (e.g., the associated claims processor computers for the included or excluded plans); and/or schedules, tables, or listings of valid override codes to override the receiving of auditing of discount card-based purchase services. Alternatively, the data storage function may be included in the service provider computer 106 and/or the discount evaluation module 180 itself, such as in the memory 142 of the service provider computer 106.

Generally, network devices and systems, including one or more of the pharmacy computer 104, service provider computer 106, discount evaluation module 180, and claims processor computer 108 may include or otherwise be associated with suitable hardware and/or software for transmitting and receiving data and/or computer-executable instructions over one or more communications links or networks. These network devices and systems may also include any number of processors for processing data and executing computer-executable instructions, as well as other internal and peripheral components that are well known in the art. Further, these network devices and systems may include or be in communication with any number of suitable memory devices operable to store data and/or computer-executable instructions. By executing computer-executable instructions, each of the network devices may form a special purpose computer or particular machine. As used herein, the term "computer-readable medium" describes any form of suitable memory or memory device.

As shown in FIG. 1, the pharmacy computer 104, service provider computer 106, claims processor computer 108, discount evaluation module 180, and database 182 may be in communication with each other via one or more networks, such as network 110, which as described below can include one or more separate or shared private and public networks, including the Internet or a publicly switched telephone network. Each of these components, the pharmacy computer 104, service provider computer 106, claims processor computer 108, discount evaluation module 180, database 182, and the network 110 will now be discussed in further detail.

Each pharmacy computer 104 may be associated with (e.g., located within and/or providing computing services for) a pharmacy or other healthcare provider, such as, for example, a pharmacy, physician's office, hospital, clinic, etc. While the exemplary pharmacy computer 104 will be described as within or part of a pharmacy or pharmacy practice management system with regard to the methods of FIGS. 3A-4B, this is for example only and is not intended to be limiting in any manner. Each pharmacy computer 104 may be any suitable processor-driven device that facilitates the processing of healthcare requests made by patients or consumers and the communication of information associated with healthcare claim transactions to the service provider computer 106, such as a server computer, a mainframe computer, one or more networked computers, a desktop computer, a personal computer, a digital assistant, a personal digital assistant, a digital tablet, an Internet appliance, an application-specific circuit, microcontroller, minicomputer, or any other processor-based device. In certain embodiments, each pharmacy computer 104 may be a suitable point-of-sale device located within a pharmacy. The execution of the computer-implemented instructions by the pharmacy computer 104 forms a special-purpose computer or other particular machine that is operable to facilitate the processing of healthcare requests made by patients and the communication of information associated with healthcare claim transactions to a service provider computer 106. Additionally, in certain example embodiments, the operations and/or control of each pharmacy computer 104 may be distributed amongst several processing components.

In addition to having one or more processors 124, each pharmacy computer 104 may include one or more memory devices 126, one or more input/output ("I/O") interfaces 128, and one or more network interfaces 130. The memory devices 126 may be any suitable memory device, for example, caches, read-only memory devices, random access memory devices, magnetic storage devices, removable storage devices, etc. The memory devices 126 may store data, executable instructions, and/or various program modules utilized by the pharmacy computer 104, for example, data files 132, an operating system ("OS") 134, and/or a client module 138, respectively. The data files 132 may include any suitable data that facilitates the receipt and/or processing of healthcare requests by the pharmacy computer 104 and the generation and/or processing of healthcare claim transactions that are communicated to the service provider computer 106. For example, the data files 132 may include, but are not limited to, healthcare information and/or contact information associated with one or more patients, information associated with the particular healthcare provider and/or the respective pharmacy computer 104, information associated with the service provider computer 106, information associated with one or more claims processors (e.g., payor identifiers such as BIN Numbers, PCNs, and Group IDs), and/or information associated with one or more healthcare claim transactions. The OS 134 may be any suitable software module that controls the general operation of the pharmacy computer 104. The OS 134 may also facilitate the execution of other software modules by the one or more processors 124, for example, the client module 138. The OS 134 may be any currently existing or future-developed operating system including, but not limited to, Microsoft Windows®, Apple OSX™, Linux, Unix, or a mainframe operating system.

The client module 138 may be an Internet browser or other suitable software, including a dedicated program, for interacting with the service provider computer 106. For example, a user 120 such as a pharmacist, pharmacy assistant, nurse practitioner, physician, nurse, or other pharmacy, hospital, physician's office, or other healthcare provider employee may utilize the client module 138 in preparing and transmitting a healthcare claim transaction, such as a prescription claim transaction, prescription billing request, or medical claim transaction, to the service provider computer 106 for delivery to the appropriate claims processor computer 108 or other third-party for adjudication or other coverage/benefits determination. The pharmacy computer 104 may also utilize the client module 138 to retrieve or otherwise receive data, messages, or responses from the service provider computer 106 and/or other components of the system 100. For example, in certain example embodiments, the client module 138 may be utilized to receive a rejection of the healthcare claim transaction and/or an adjudicated healthcare claim transaction response from the service provider computer 106 as will be described below.

The one or more I/O interfaces 128 may facilitate communication between the pharmacy computer 104 and one or more input/output devices, for example, one or more user interface devices, such as, a display, keypad, keyboard, control panel, touch screen display, remote control, mouse, microphone, etc. that facilitate user interaction with the pharmacy computer 104. For example, the one or more I/O interfaces 128 may facilitate entry of information associated with a healthcare claim transaction by an employee 120 of a pharmacy, such as a pharmacy employee, pharmacist, hospital employee, or nurse practitioner affiliated with a pharmacy, hospital, physician's office or other similar healthcare provider. The one or more network interfaces 130 may facilitate connection of the pharmacy computer 104 to one or more suitable networks, for example, the network 110 illustrated in FIG. 1. In this regard, the pharmacy computer 104 may receive and/or communicate information to other network components of the system 100, such as the service provider computer 106.

With continued reference to FIG. 1, the service provider computer 106 may include, but is not limited to, any suitable processor-driven device that is configured for receiving, processing, and fulfilling requests from the one or more pharmacy computers 104, the discount evaluation module 180, the database 182, and/or the claims processor computer 108 relating to pharmacy, benefits, billing, electronic prescription submission, and/or other healthcare claim transactions and/or other activities. In certain exemplary embodiments, the service provider computer 106 may be a switch/router that routes healthcare claim transactions and/or other healthcare requests from a pharmacy to a claims processor. For example, the service provider computer 106 may route healthcare claim transactions communicated from the pharmacy computer 104 (at e.g., a pharmacy) to a claims processor computer 108, such as a pharmacy benefits manager (PBM), an insurer, a Medicare payor, other governmental healthcare insurance payor, or other third-party payor.

In certain embodiments, the service provider computer 106 may include a suitable host server, host module, or other software that facilitates the receipt of a healthcare claim transaction from a pharmacy computer 104 and/or the routing of the received healthcare claim transaction to a claims processor computer 108. Any number of healthcare provider computers 104, discount evaluation modules 180, databases 182, and/or claims processor computers 108 may be in communication with the service provider computer 106, via the network 110 for example, as desired in various embodiments.

The service provider computer 106 may include any number of special purpose computers or other particular machines, application-specific circuits, microcontrollers, personal computers, minicomputers, mainframe computers, servers, networked computers, and/or other processor-driven devices. In certain embodiments, the operations of the service provider computer 106 may be controlled by computer-executed or computer-implemented instructions that are executed by one or more processors 140 associated with the service provider computer 106 to form a special purpose computer or other particular machine that is operable to facilitate the receipt, routing, and/or processing of healthcare claim transactions. The one or more processors 140 that control the operations of the service provider computer 106 may be incorporated into the service provider computer 106 and/or in communication with the service provider computer 106 via one or more suitable networks. In certain exemplary embodiments, the operations and/or control of the service provider computer 106 may be distributed amongst several processing components.

Similar to the pharmacy computer 104 described above, the service provider computer 106 may include one or more processors 140, one or more memory devices 142, one or more input/output ("I/O") interfaces 144, and one or more network interfaces 146. The one or more memory devices 142 may be any suitable memory devices, for example, caches, read only memory devices, random access memory devices, magnetic storage devices, removable memory devices, etc. The one or more memory devices 142 may store data, executable instructions, and/or various program modules utilized by the service provider computer 106, for example, data files 148, an operating system ("OS") 150, the host module 154, a service provider module 156, and a database management system ("DBMS") 152 to facilitate management of data files 148 and other data stored in the memory devices 142. The OS 150 may be a suitable software module that controls the general operation of the service provider computer 106 and/or that facilitates the execution of other software modules. The OS 150 may be any currently existing or future-developed operating system including, but is not limited to, Microsoft Windows®, Apple OSX™, Linux, Unix, or a mainframe operating system.

The service provider module 156 may be operable to perform one or more pre-edits or pre-analysis on a received healthcare claim transaction prior to routing or otherwise communicating the received healthcare claim transaction, such as a prescription claim transaction, to a suitable claims processor computer 108. Additionally, the service provider module 156 may be operable to perform one or more post-edits on an adjudicated reply or response that is received from a claims processor computer 108 for a healthcare claim transaction prior to routing the adjudicated response to one of the pharmacy computers 104. In one example embodiment, the service provider module may be operable to parse the healthcare claim transaction to determine one or more of the pharmacy identifier, payor identifier, prescribed product (e.g., medications, devices, etc.) or service identifier, and transaction code and can determine if the pharmacy identified by the pharmacy identifier, the claims processor identified by the payor identifier, the prescribed product (e.g., medication, device, etc.) or service identified by the prescribed product or service identifier, and/or the transaction type identified by the transaction code receive audit related services for discount card-based purchases. The service provider module 156 may also be operable to parse the healthcare claim transaction to determine if it includes an override code and to determine if the override code is valid to override the audit analysis services for discount card-based purchases. In yet another example embodiment, the service provider module 156 may be operable to compare patient pay amounts identified in the adjudicated response to the healthcare claim transaction to the Usual and Customary Charge identified in the healthcare claim transaction to determine if the patient pay amount is less than the amount of the Usual and Customary Charge. The service provider module 156 may generate a reversal transaction and transmit the reversal transaction to the claims processor computer 108 for adjudication and may also change the adjudicated healthcare claim transaction response from paid to rejected or may generate a rejected adjudicated healthcare claim transaction response and may transmit the rejected response to the pharmacy computer 104. In yet another example embodiment, the service provider module 156 may be operable to calculate the sum of the patient pay amount and the amount paid by the claims processor identified in an adjudicated healthcare claim transaction response and compare the sum to the Usual and Customary Charge identified in the healthcare claim transaction to determine if the sum of the patient pay and the amount paid by the claims processor is less than the amount in the Usual and Customary Charge listed in the healthcare claim transaction. The service provider module 156 may further generate a reversal transaction and transmit the reversal transaction to the claims processor computer 108 for adjudication and may also change the adjudicated healthcare claim transaction response from paid to rejected or may generate a new rejected adjudicated healthcare claim transaction response and may transmit the rejected adjudicated healthcare claim transaction response to the pharmacy computer 104. In certain example embodiments, the discount evaluation module 180 or a combination of the discount evaluation module 180 and the service provider module 156 may also be operable to perform the functions described with references to the service provider module 156 herein. A wide variety of different pre-edits and/or post-edits may also be performed by the service provider module 156 as desired in various embodiments of the disclosure.

According to one exemplary embodiment, the data files 148 may store healthcare claim transaction records associated with communications received from various pharmacy computers 104 and/or various claims processor computers 108. The data files 148 may also store any number of suitable routing tables that facilitate determining the destination of communications received from a pharmacy computer 104 or claims processor computer 108. In certain example embodiments, the data discussed herein that is included in the database 182 may alternatively be stored and accessed from the data files 148. The exemplary data files 148 may also store records containing, for example, patient identification data, healthcare claim transactions, tables identifying pharmacies, prescribed product (e.g., medications, devices, etc.) or service identifiers, override codes, payor identifiers, and transaction type codes.

The host module 154 may receive, process, and respond to requests from the client module 138 of the pharmacy computer 104, may receive, process, and respond to requests of the discount evaluation module 180, and may further receive, process, and respond to requests of the host module 172 of the claims processor computer 108. The service provider computer 106 may include additional program modules for performing other processing methods described herein. Those of ordinary skill in the art will appreciate that the service provider computer 106 may include alternate and/or additional components, hardware or software without departing from exemplary embodiments of the disclosure.

With continued reference to the service provider computer 106, the one or more I/O interfaces 144 may facilitate communication between the service provider computer 106 and one or more input/output devices, for example, one or more user interface devices, such as a display, keypad, keyboard, mouse, control panel, touch screen display, remote control, microphone, etc. that facilitate user interaction with the service provider computer 106. The one or more network interfaces 146 may facilitate connection of the service provider computer 106 to one or more suitable networks, for example, the network 110 illustrated in FIG. 1. In this regard, the service provider computer 106 may communicate with other components of the system 100.

One or more discount evaluation modules 180 may also be operative with or included with the service provider computer 106. The discount evaluation module 180 may include computer-executable instructions for facilitating the auditing of pharmacy income potential for discount card-based purchases based on an evaluation of the data in the healthcare claim transaction and as part of the processing of a healthcare claim transaction. As an example, the discount evaluation module 180 may be operative or configured to be operable to parse the healthcare claim transaction to determine one or more of the pharmacy identifier, payor identifier, prescribed product (e.g., medications, devices, etc.) or service identifier, and transaction code and can determine if the pharmacy identified by the pharmacy identifier, the claims processor identified by the payor identifier, the prescribed product or service identified by the prescribed product (e.g., medications, devices, etc.) or service identifier, and/or the transaction type identified by the transaction code receive audit related services for discount card-based purchases. The discount evaluation module 180 may also be operable to parse the healthcare claim transaction to determine if it includes an override code and to determine if the override code is valid to override the audit analysis services for discount card-based purchases. In yet another example embodiment, the discount evaluation module 180 may be operable to compare patient pay amounts to the amount of the Usual and Customary Charge for the pharmacy identified in the healthcare claim transaction to determine if the patient pay amount is less than the Usual and Customary Charge amount. The discount evaluation module 180 may generate a reversal transaction and transmit the reversal transaction to the claims processor computer 108 for adjudication and may also change the adjudicated healthcare claim transaction response from paid to rejected or may generate a rejected adjudicated healthcare claim transaction response and may facilitate transmission of the rejected response to the pharmacy computer 104. In yet another example embodiment, the discount evaluation module 180 may be operable to calculate the sum of the patient pay amount and the amount paid by the claims processor identified in an adjudicated healthcare claim transaction response and can compare the sum to the amount of the Usual and Customary Charge field identified in the healthcare claim transaction to determine if the sum of the patient pay and the amount paid by the claims processor is less than the Usual and Customary Charge amount for the pharmacy. The discount evaluation module 180 may further generate a reversal transaction and transmit the reversal transaction to the claims processor computer 108 for adjudication and may also change the adjudicated healthcare claim transaction response from paid to rejected or may generate a new rejected adjudicated healthcare claim transaction response and may facilitate transmission of the rejected adjudicated healthcare claim transaction response to the pharmacy computer 104.

In one example embodiment, the discount evaluation module 180 may be implemented as computer-implemented instructions of the memory 128 of the service provider computer 106. Alternatively, the discount evaluation module 180 may also be implemented as computer-implemented instructions of a memory of a separate processor-based system communicably coupled to the service provider computer 106, according to another example embodiment.

The database 182 of FIG. 1 represents one or more databases that can be locally or remotely distributed with respect to the service provider computer 106 and/or the discount evaluation module 180. The database 182 may be operable to store information associated with various patients and/or from various healthcare claim transactions that have been received by the service provider computer 106 and/or adjudicated healthcare claim transaction responses adjudicated by the one or more claims processor computers 106. The database 182 may also store schedules, tables or listings of pharmacies or other healthcare providers receiving auditing or discount card-based purchase services; schedules tables, or listings of medications or other healthcare products for which auditing of discount card-based purchase services are provided; schedules, tables, or listings of transactions codes for transactions that receive auditing of discount card-based purchase services; schedules, tables, or listings of payor identifiers (e.g., Banking Identification Numbers (BIN Numbers), BIN Numbers and Processor Control Numbers (PCN), and/or BIN Number and Group ID) that identify a government payer plan (e.g., the associated claims processor computers for those plans); schedules, tables, or listings of payor identifiers that identify payer plans that are excluded or included to receive auditing of discount card-based purchase services (e.g., the associated claims processor computers for the included or excluded plans); and/or schedules, tables, or listings of valid override codes to override the receiving of auditing of discount card-based purchase services. The data in the database 182 may then be accessed and evaluated by the discount evaluation module 180 and/or the service provider computer 106, such as by the service provider module 156.

With continued reference to FIG. 1, the claims processor computer 108 (e.g., a pharmacy claims processor computer for a pharmacy claims processor) may be any suitable processor-driven device that facilitates receiving, processing, and/or fulfilling healthcare claim transactions, such as a prescription claim transaction, prescription billing request, or medical claim transaction, received from the service provider computer 106. For example, the claims processor computer 108 may be a processor-driven device associated with one or more PBMs, insurers, government payors, Medicare Part D payors, accountable care organizations, or claims clearinghouses. As desired, the claims processor computer 108 may include any number of special purpose computers or other particular machines, application-specific circuits, microcontrollers, personal computers, minicomputers, mainframe computers, servers, and the like.

In certain exemplary embodiments, the operations of the claims processor computer 108 may be controlled by computer-executed or computer-implemented instructions that are executed by one or more processors associated with the claims processor computer 108 to form a special purpose computer or other particular machine that is operable to facilitate the receipt, processing, and/or fulfillment of healthcare claim transactions received from the service provider computer 106. The one or more processors that control the operations of the claims processor computer 108 may be incorporated into the claims processor computer 108 and/or in communication with the claims processor computer 108 via one or more suitable networks. In certain embodiments, the operations and/or control of the claims processor computer 108 may be distributed amongst several processing components.

Similar to other components of the system 100, the claims processor computer 108 may include one or more processors 158, one or more memory devices 160, one or more input/output ("I/O") interfaces 162, and one or more network interfaces 164. The one or more memory devices 160 may be any suitable memory devices, for example, caches, read-only memory devices, random access memory devices, magnetic storage devices, removable memory devices. The one or more memory devices 160 may store data, executable instructions, and/or various program modules utilized by the claims processor computer 108, for example, data files 166, an operating system ("OS") 168, a database management system ("DBMS") 170, and a host module 172. The data files 166 may include any suitable information that is utilized by the claims processor computer 108 to process healthcare claim transactions, for example, patient profiles, patient insurance information, other information associated with a patient, information associated with a healthcare provider, etc. The OS 168 may be a suitable software module that controls the general operation of the claims processor computer 108. The OS 168 may also facilitate the execution of other software modules by the one or more processors 158, for example, the DBMS 170 and/or the host module 172. The OS 168 may be any currently existing or future-developed operating system including, but is not limited to, Microsoft Windows®, Apple OSX™, Linux, Unix, or a mainframe operating system.

The DBMS 170 may be a suitable software module that facilitates access and management of one or more databases that are utilized to store information that is utilized by the claims processor computer 108 in various example embodiments. The host module 172 may initiate, receive, process, and/or respond to requests, such as healthcare claim transactions, from the host module 154 of the service provider computer 106. The claims processor computer 108 may include additional program modules for performing other pre-processing or post-processing methods described herein. Those of ordinary skill in the art will appreciate that the claims processor computer 108 may include alternate and/or additional components, hardware or software without departing from the example embodiments described herein.

The one or more I/O interfaces 162 may facilitate communication between the claims processor computer 108 and one or more input/output devices, for example, one or more user interface devices, such as a display, keypad, keyboard, mouse, control panel, touch screen display, remote control, microphone, etc. that facilitate user interaction with the claims processor computer 108. The one or more network interfaces 164 may facilitate connection of the claims processor computer 108 to one or more suitable networks, for example, the network 110. In this regard, the claims processor computer 108 may receive healthcare claim transactions and/or other communications from the service provider computer 106 and the claims processor computer 108 may communicate information associated with processing the healthcare claim transactions to the service provider computer 106.

The network 110 may include any telecommunication and/or data network, whether public, private, or a combination thereof, including a local area network, a wide area network, an intranet, the Internet, intermediate hand-held data transfer devices, and/or any combination thereof and may be wired and/or wireless. The network 110 may also allow for real-time, off-line, and/or batch transactions to be transmitted between or among the pharmacy computer 104, the service provider computer 106, the discount evaluation module 180, the database 182, and/or the claims processor computer 108. Due to network connectivity, various methodologies, as described herein may be practiced in the context of distributed computing environments. Although the service provider computer 106 is shown for simplicity as being in communication with the pharmacy computer 104, the discount evaluation module 180, the database 182, and/or the claims processor computer 108 via one intervening network 110, it is to be understood that any other network configuration is possible. For example, intervening network 110 may include a plurality of networks, each with devices such as gateways and routers for providing connectivity between or among networks 110. Instead of or in addition to a network 110, dedicated communication links may be used to connect the various devices in accordance with an example embodiment. For example, the service provider computer 106 may form the basis of network 110 that interconnects one or more of the pharmacy computer 104, the discount evaluation module 180, the database 182, and the claims processor computer 108.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. For example, in one exemplary embodiment, the service provider computer 106 (or other computer) may be implemented as a specialized processing machine that includes hardware and/or software for performing the methods described herein. Accordingly, the exemplary embodiments described herein should not be construed as being limited to any particular operating environment, system architecture, or device configuration.

Operational Overview

Figure 2A:
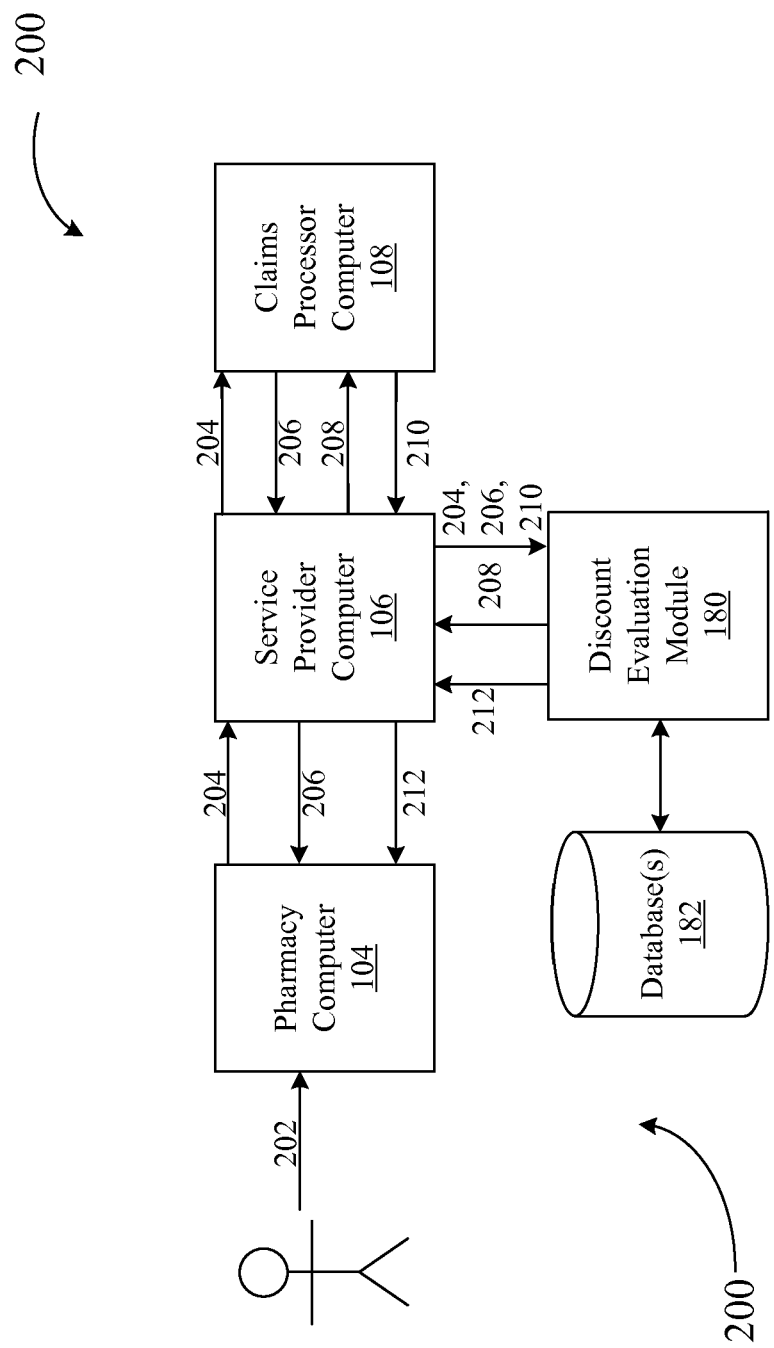
FIG. 2A is a diagram of an example data flow for auditing of pharmacy income potential for discount card-based purchases based on an evaluation of the data in the healthcare claim transaction and as part of the processing of a healthcare claim transaction processed through a service provider according to one exemplary embodiment.
Figure 3A:
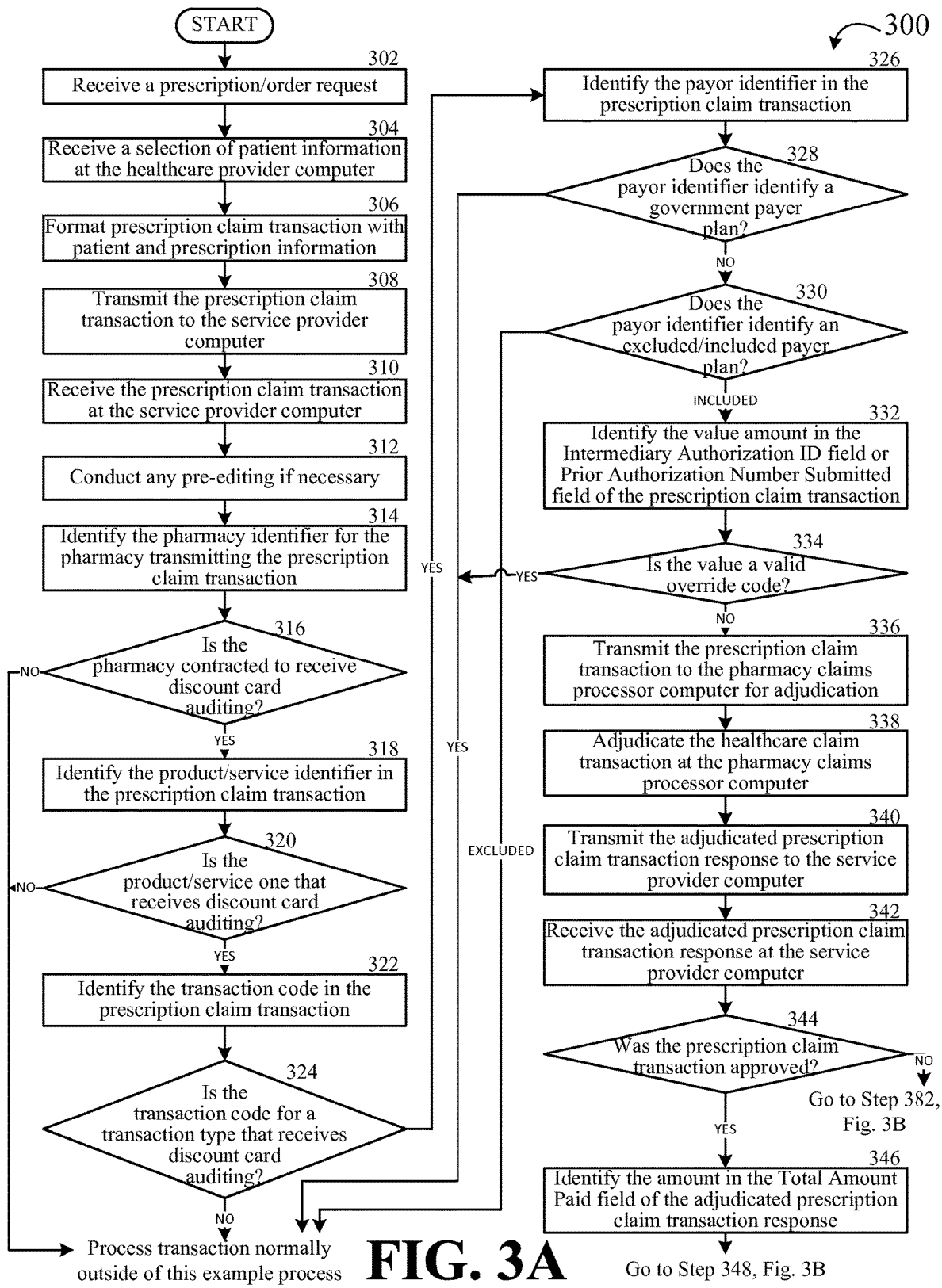
FIGS. 3A and 3B are a flow chart of an example method for auditing of pharmacy income potential for discount card-based purchases based on an evaluation of the data in the healthcare claim transaction and as part of the processing of a healthcare claim transaction, in accordance with one exemplary embodiment.
Figure 3B:
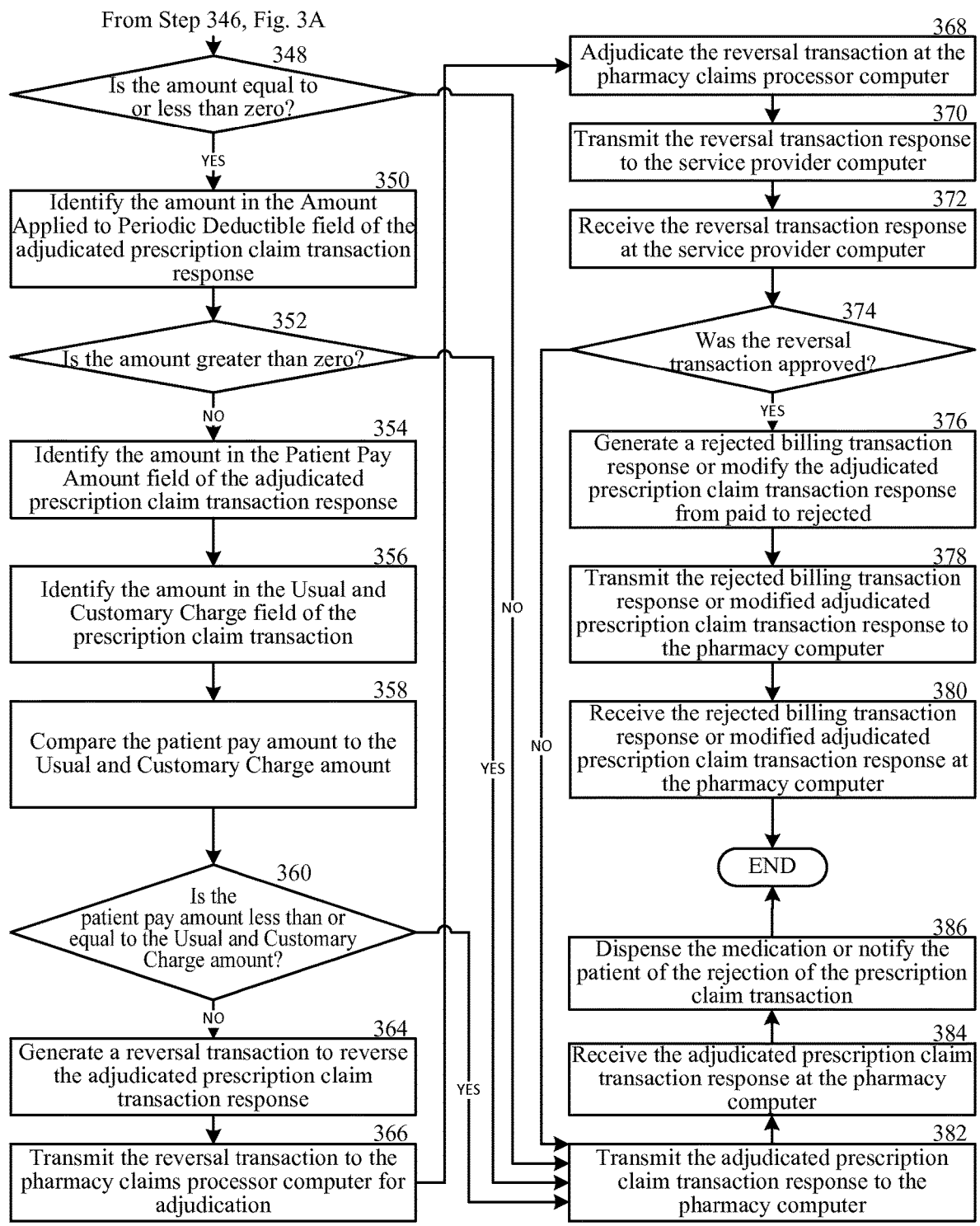

FIG. 2A is a diagram of one example data flow 200 for auditing of pharmacy income potential for discount card-based purchases based on an evaluation of the data in the healthcare claim transaction as part of or in-line with the processing of a healthcare claim transaction through a service provider, such as through the service provider computer 106 illustrated in FIG. 1. FIGS. 3A-3B are flow charts of an example method 300 for auditing of pharmacy income potential for discount card-based purchases based on an evaluation of the data in the healthcare claim transaction and as part of the processing of the healthcare claim transaction, such as a prescription claim transaction, prescription billing request, or medical claim transaction, in accordance with one exemplary embodiment. The exemplary method 300, described below, may be performed by a suitable service provider computer 106 and/or discount evaluation module 180.

The exemplary methods 300-400 will be described with reference to a pharmacy as the healthcare provider; however, this is only for purposes of example as other healthcare providers could be substituted for, and should each be individually read as being a part of each of these methods. As such, where the discussion of the methods below and the drawings state a pharmacy, any other healthcare provider could be substituted, such as a physician, hospital, physician's office, clinic, prescriber of the medication, or healthcare center. Furthermore, the exemplary methods will be described with reference to a pharmacy claims processor as the claims processor; however, this is only for purposes of example as other claims processors could be substituted for and should be each individually read as being part of each of these methods.

In addition, the exemplary methods 300-400 described below will be described with reference to a prescription claim transaction as the healthcare claim transaction; however, this also is only for purposes of example as other healthcare claim transactions (which may include, for example, a prescription claim transaction, prescription billing request, or medical claim transaction) could be substituted for the prescription claim transaction and each form of healthcare claim transaction should each individually be read as being used in the methods described below.

Referring now to FIGS. 1, 2A, 3A and 3B, the exemplary method 300 begins at the START step and proceeds to step 302, where a prescription/order request 202 is received. In one example embodiment, the prescription/order request 202 is received by a pharmacist at a pharmacy. The prescription/order request 202 may be received from a patient, another healthcare provider prescribing a medication or service (e.g., physician, hospital, etc.), by phone, via the Internet, via an electronic prescription (i.e., electronic prescription order transaction, e-script, or e-prescription) or by way of an electronic system order. For example, the prescription 202 may be received by the patient from a prescriber of the medication, such as a doctor, dentist, nurse, or physician's assistant. The patient may go to the location of the pharmacy and physically hand the prescription request 202 to the pharmacist or make a request via a web portal communicably coupled to the healthcare provider computer 104 or an IVR communicably coupled or otherwise providing order data to the pharmacy computer 104. The pharmacist determines the patient's name and accesses the pharmacy computer 104, which receives a selection of patient information from the pharmacist via the I/O interface 128 in step 304. For example, the pharmacist accesses the pharmacy computer 104 and accesses a database of patient information, which may be stored in memory 126 or in another database either local or remote from the pharmacy computer 104. The pharmacist can then select the name or other patient identification information in the patient information database that matches the name or other identification information of the patient. In certain example embodiments, this information from the database includes the payor identifier for the transaction, such as the Payor ID/routing information (e.g., BIN Number, BIN Number and PCN, and/or BIN Number and Group ID) that identifies the pharmacy claims processor computer 108 intended to receive and adjudicate the prescription claim transaction 204.

In step 306, a prescription claim transaction 204 is generated and/or formatted at the pharmacy computer 104. In certain exemplary embodiments, the pharmacy computer 104 formats the prescription claim transaction 204 with patient information, payor identifier information, and prescribed product (e.g., medications, devices, etc.) information. The information can be input into the prescription claim transaction 204 by the pharmacist via the I/O interface 128 or automatically retrieved and entered by the pharmacy computer 104 based at least in part on historical transaction information for the patient in the data files 132 or a database communicably coupled to the pharmacy computer 104. According to one example embodiment, the prescription claim transaction 204 may be formatted in accordance with a version of the National Council for Prescription Drug Programs (NCPDP) Telecommunication Standard, although other standards may be utilized as well.

As discussed above, the prescription claim transaction 204 may include a BIN Number, a BIN Number and PCN, and/or a BIN Number and Group ID for identifying a particular pharmacy claims processor computer (i.e., PBM, healthcare insurance company, Medicare or other government healthcare insurance payor, Medicare Part D provider, etc.), such as the pharmacy claims processor computer 108, as a destination for the prescription claim transaction 204. In addition, the prescription claim transaction 204 may also include information relating to the patient, payor, prescriber, healthcare provider, and/or the requested medication. As an example, the prescription claim transaction 204 may include one or more of the following information:

Payor identifier—Payor ID/Routing Information
BIN Number (i.e. Banking Identification Number), BIN Number and Processor Control Number (PCN) and/or BIN Number and Group ID, that designates a destination (e.g., the pharmacy claims processor computer 108) of the prescription claim transaction 204
Patient Information
Name (e.g. Patient Last Name, Patient First Name, etc.)
Date of Birth of Patient
Age of Patient
Gender
Patient Address (e.g. Street Address, Zip Code, etc.)
Patient Contact Information (e.g. patient telephone number, email address, etc.)
Patient Health Condition Information
Patient ID or other identifier (e.g., Health Insurance Claim Number (HICN), social security number, etc.)
Insurance/Coverage Information
Cardholder Name (e.g. Cardholder First Name, Cardholder Last Name)
Cardholder ID and/or other identifier (e.g. person code)
Group ID and/or Group Information
Prescriber Information Primary Care Provider ID or other identifier (e.g. NPI code)
Primary Care Provider Name (e.g. Last Name, First Name)
Prescriber ID or other identifier (e.g. NPI code, DEA number)
Prescriber Name (e.g. Last Name, First Name)
Prescriber Contact Information (e.g. Telephone Number)
Pharmacy or other Healthcare Provider Information (e.g. store name, chain identifier, etc.)
Pharmacy or other Healthcare Provider ID (e.g. NPI code)
Claim Information
Medication, service, or product information—Product (medication or device) or service identifier (e.g. National Drug Code (NDC) code, RxNorm code, etc.), product or service name, etc.
Prescription/Service Reference Number
Date Prescription Written
Quantity Dispensed
Days' Supply
Diagnosis/Condition (e.g., diagnosis code)
Pricing information for the drug/service/product (e.g. ingredient cost (e.g., in an Ingredient Cost field), dispensing fee (e.g., in a Dispensing Fee field), gross amount due (e.g., in a Gross Amount Due field), and Usual and Customary Charge amount (e.g., in a Usual and Customary Charge field))
Number of Refills Authorized
One or more NCPDP Message Fields
One or more Drug Utilization (DUR) Codes
Date of Service.

The prescription claim transaction 204 can be used to determine if the pharmacy claims processor associated with the pharmacy claims processor computer 108 approves or rejects payment coverage for the prescribed product (e.g., medications, devices, etc.) being requested in the prescription claim transaction 204 and, if approved, the amount the pharmacy claims processor will cover (or pay) for the prescribed product (e.g., medication, device, etc.) or service being requested and how much the patient pay amount (the amount the patient is responsible to pay for) will be.

The pharmacy computer 104 transmits the prescription claim transaction 204 to the service provider computer 106 in step 308. In step 310, the service provider computer 106 receives the prescription claim transaction 204. For example, the prescription claim transaction 204 can be transmitted by the pharmacy computer 104 to the service provider computer 106 through the network 110. The service provider computer 106 conducts any pre-editing, if necessary, on the prescription claim transaction 204 in step 312. The pre-edits may include verifying, adding, and/or editing information included in the prescription claim transaction 204 prior to it being communicated to a pharmacy claims processor computer 108. For example, the service provider computer 106 can parse the prescription claim transaction 204 to determine/edit the financial fields, the service code, the quantity dispensed, and or the Days' Supply of the product. In addition, the service provider computer 106 can determine whether non-insurance related financial assistance, (e.g., an incentive program, such as a coupon, voucher, rebate, discount, loyalty award, or other equivalent non-insurance benefit or the like) is available for the patient and/or the prescribed product (e.g., medications, devices, etc.) identified in the prescription claim transaction 204. In addition, the discount evaluation module 156 or another portion of the service provider computer 106 can determine if the prescription claim transaction 204 is for a discount card based healthcare purchase. For example, the discount evaluation module can compare the BIN Number, BIN Number and PCN, or BIN Number and Group ID parsed and identified from the prescription claim transaction 204 to a table, list, or schedule of BIN Numbers, BIN Numbers and PCNs, or BIN Numbers and Group IDs, that identify discount card purchase programs. Based on a match, of the BIN Number, BIN Number and PCN, or BIN Number and Group ID from the prescription claim transaction 204 to at least one of the table, list, or schedule of BIN Numbers, BIN Numbers and PCNs, or BIN Numbers and Group IDs, the discount evaluation module 156 can determine that the prescription claim transaction 204 is for a purchase under a discount card program.

In step 314, the discount evaluation module 156 or another portion of the service provider computer 106 can identify the pharmacy identifier in the prescription claim transaction 204. For example, the discount evaluation module 156 may parse the prescription claim transaction 204 to determine the pharmacy identifier (e.g., NPI code, pharmacy name, pharmacy address) in a predetermined field of the prescription claim transaction 204. In step 316, an inquiry is conducted to determine if the pharmacy identified by the pharmacy identifier in the prescription claim transaction 204 has contracted with the service provider associated with the service provider computer 106 to receive auditing services of adjudicated prescription claim transactions for discount card-based healthcare purchases. In one example embodiment, the determination can be made by the discount evaluation module 180 or another portion of the service provider computer 106 (e.g., the service provider module 156). In one example, the discount evaluation module 180 may compare the identified pharmacy identifier from the prescription claim transaction 204 to a table, schedule, or listing of records containing pharmacy identifiers in, for example, the database 182 or the data files 148 for pharmacies or pharmacy chains that have contracted to receive auditing services of adjudicated healthcare claim transactions for discount card-based healthcare purchases to determine if a match of pharmacy identifiers exists. If a match does not exist and the pharmacy has not contracted to receive auditing services of adjudicated healthcare claim transactions for discount card-based healthcare purchases, the NO branch is followed out of the current example process and the prescription claim transaction 204 is processed in a standard manner. If a match does exist and the pharmacy has contracted to receive auditing services of adjudicated healthcare claim transactions for discount card-based healthcare purchases, then the YES branch is followed to step 318.

In step 318, the discount evaluation module 180 or another portion of the service provider computer 106 can identify the prescribed product or service identifier (e.g., medication identifier, device identifier service identifier) in the prescription claim transaction 204. For example, the discount evaluation module 180 may parse the prescription claim transaction 204 to determine the prescribed product or service identifier (e.g., NDC code, RxNorm code, medication/product/service name) in a predetermined field of the prescription claim transaction 204. In step 320, an inquiry is conducted to determine if the medication or product identified in the prescription claim transaction 204 qualifies for auditing services of adjudicated healthcare claim transactions for discount card-based healthcare purchases. In one example embodiment, the determination can be made by the discount evaluation module 180 or another portion of the service provider computer 106. In one example, the discount evaluation module 180 may compare the identified prescribed product (e.g., medications, devices, etc.) or service identifier from the prescription claim transaction 204 to a table, schedule, or listing of records containing prescribed product and/or service identifiers in, for example, the database 182 or the data files 148 for medications, products, or services that receive auditing services of adjudicated healthcare claim transactions for discount card-based healthcare purchases to determine if a match of medication identifiers exists. If a match does not exist and the medication, product, or service does not receive auditing services of adjudicated healthcare claim transactions for discount card-based healthcare purchases, the NO branch is followed out of the current example process and the prescription claim transaction 204 is processed in a standard manner. If a match does exist and the medication, product, or service does receive auditing services of adjudicated healthcare claim transactions for discount card-based healthcare purchases, the YES branch is followed to step 322.

In step 322, the discount evaluation module 180 or another portion of the service provider computer 106 can identify the transaction code identifying the transaction type (e.g., a prescription claim transaction, prescription billing request, or medical claim transaction) in the prescription claim transaction 204. For example, the discount evaluation module 180 may parse the prescription claim transaction 204 to determine the transaction code in a predetermined field of the prescription claim transaction 204. In step 324, an inquiry is conducted to determine if the transaction type identified in the prescription claim transaction 204 qualifies for auditing services of adjudicated healthcare claim transactions for discount card-based healthcare purchases. In one example embodiment, the determination can be made by the discount evaluation module 180 or another portion of the service provider computer 106. In one example, the discount evaluation module 180 may compare the identified transaction code from the prescription claim transaction 204 to a table, schedule, or listing of records containing transaction codes in, for example, the database 182 or the data files 148 for transaction types that receive auditing services of adjudicated healthcare claim transactions for discount card-based healthcare purchases to determine if a match of transaction codes exists. In one example embodiment, the transaction types that receive auditing services of adjudicated healthcare claim transactions for discount card-based healthcare purchases are healthcare claim transactions (e.g., prescription claim transactions), prescription billing requests, and healthcare order transactions. If a match does not exist and the particular transaction type does not receive auditing services of adjudicated healthcare claim transactions for discount card-based healthcare purchases, the NO branch is followed out of the current example process and the prescription claim transaction 204 is processed in a standard manner. If a match does exist and the transaction type identified by the transaction code does receive auditing services of adjudicated healthcare claim transactions for discount card-based healthcare purchases, the YES branch is followed to step 326.

In step 326, the discount evaluation module 180 or another portion of the service provider computer 106 can identify the payor identifier (e.g., identifier that designates the pharmacy claims processor computer 108 to adjudicate the prescription claim transaction 204 (e.g., BIN Number, BIN Number and PCN, or BIN Number and Group ID) in the prescription claim transaction 204. For example, the discount evaluation module 156 may parse the prescription claim transaction 204 to determine the payor identifier in a predetermined field of the prescription claim transaction 204. In step 328, an inquiry is conducted to determine if the payor identifier in the prescription claim transaction 204 identifies a government payer healthcare insurance plan. Examples of government payer healthcare insurance plans include government-funded healthcare insurance program, such as Medicare, Medicaid, or other government healthcare insurance program. In one example embodiment, the determination can be made by the discount evaluation module 180 or another portion of the service provider computer 106. In one example, the discount evaluation module 180 may compare the identified payor identifier from the prescription claim transaction 204 to a table, schedule, or listing of records containing payor identifiers in, for example, the database 182 or the data files 148 for payors/claims processors that are Medicare, Medicaid, another government-funded healthcare insurance program to determine if a match of payor identifiers exists. If a match does not exist the NO branch is followed to step 330. If a match does exist, then the YES branch is followed out of the current example process and the prescription claim transaction 204 is processed in a standard manner.

In step 330, an inquiry is conducted to determine if the payor identifier in the prescription claim transaction 204 identifies a pharmacy claims processor that is specifically included or excluded from receiving auditing services of adjudicated healthcare claim transactions for discount card-based healthcare purchases. For example, the system may be set up to optionally have and excluded list, an included list, or both for pharmacy claims processors that are or are not to receive auditing services of adjudicated healthcare claim transactions for discount card-based healthcare purchases. For example, there may be certain pharmacy claims processors, in addition to government funded insurance plans, that are not to receive auditing services of adjudicated healthcare claim transactions for discount card-based healthcare purchases. Similarly, there may be certain plans that were previously exclude but are intended to receive auditing services of adjudicated healthcare claim transactions for discount card-based healthcare purchases, and are thus, within the included list. In one example embodiment, the determination can be made by the discount evaluation module 180 or another portion of the service provider computer 106. In one example, the discount evaluation module 180 may compare the identified payor identifier from the prescription claim transaction 204 to a table, schedule, or listing of records containing payor identifiers in, for example, the database 182 or the data files 148 for payors/claims processors that are either intended to be included or excluded from receiving auditing services of adjudicated healthcare claim transactions for discount card-based healthcare purchases to determine if a match of payor identifiers exists. If the list is an exclusion list and a match does exist the EXCLUDED branch is followed out of the current example process and the prescription claim transaction 204 is processed in a standard manner. Otherwise, if a match to the exclusion list is not made, then the INCLUDED branch is followed to step 332. Similarly, if the list is an inclusion list and a match does exist the INCLUDED branch is followed to step 332. Otherwise, if a match to the inclusion list is not made, then the EXCLUDED branch is followed out of the current example process and the prescription claim transaction 204 is processed in a standard manner.

In step 332, the discount evaluation module 180 or another portion of the service provider computer 106 can identify a value or amount in the Intermediary Authorization ID field, the Prior Authorization Number Submitted field, or another mutually agreed upon field in the prescription claim transaction 204. In certain example embodiments, these fields are where a pharmacy may enter an override code to override or prevent receiving auditing services of adjudicated healthcare claim transactions for discount card-based healthcare purchases. For example, the discount evaluation module 180 may parse the prescription claim transaction 204 to determine the value or amount in the Intermediary Authorization ID field, Prior Authorization Number Submitted field, or another mutually agreed upon field of the prescription claim transaction 204. In step 334, an inquiry is conducted to determine if the value or amount identified in the Intermediary Authorization ID field, Prior Authorization Number Submitted field, or the other mutually agreed upon field of the prescription claim transaction 204 is a valid override code. In one example embodiment, the determination can be made by the discount evaluation module 180 or another portion of the service provider computer 106. In one example, the discount evaluation module 180 may compare the identified value or amount from the Intermediary Authorization ID field, Prior Authorization Number Submitted field, or the other mutually agreed upon field of the prescription claim transaction 204 to a table, schedule, or listing of records containing valid override codes in, for example, the database 182 or the data files 148 to determine if a match of override codes exists. If a match does not exist, the NO branch is followed to step 336. If a match does exist, the YES branch is followed out of the current example process and the prescription claim transaction 204 is processed in a standard manner.

The service provider computer 106 transmits the prescription claim transaction 204 to the pharmacy claims processor computer 108 in step 336. For example, a prescription claim transaction 204 can be transmitted from the service provider computer 106 to the pharmacy claims processor computer 108 via the network 110. The pharmacy claims processor computer 108 receives and adjudicates the prescription claim transaction 204 in step 338 to determine if the patient has coverage, to determine to what extent the patient's coverage covers the requested medication, product, or service identified in the transaction 204, and to generate an adjudication 206 as to whether the transaction 204 is approved/paid or rejected. Example transaction responses in the adjudicated prescription claim transaction response 206 can include, but are not limited to, accepted, approved, paid, captured, denied (e.g., rejected), and denied (e.g., rejected) with request for additional information and resubmission. In certain exemplary embodiments, the transaction responses can be input into a field of the prescription claim transaction 204 that is recognized by the service provider computer 106 and/or the pharmacy computer 104. Typically, if the transaction response for the transaction 204 is approved, the adjudicated prescription claim transaction response 206 provides the amount of the cost of the medication, product, or service that will be covered by the pharmacy claims processor associated with the pharmacy claims processor computer 108 (the total amount paid, which is provided in the Total Amount Paid field of the adjudicated prescription claim transaction response 206), any amount applied to a patient deductible which is provided in the amount applied to periodic deductible field of the adjudicated prescription claim transaction response 206), and the patient pay amount (which is provided in the Patient Pay Amount field of the adjudicated prescription claim transaction response 206) and if the transaction response is a rejection, the adjudicated response 206 provides the reason for the rejection (e.g., in the form of a reject code, for example, patient not covered, Cardholder ID submitted in the transaction is inactive, prior authorization required, medication not covered, etc.).

In step 340, the pharmacy claims processor computer 108 transmits the adjudicated prescription claim transaction response 206 to the service provider computer 106 via, for example, the network 110. The service provider computer 106 receives the adjudicated prescription claim transaction response 206 from the pharmacy claims processor computer 108 in step 342. In step 344, an inquiry is conducted to determine if the adjudicated prescription claim transaction response 206 has a transaction response indicating that the transaction 204 was approved or paid. In one exemplary embodiment, the service provider module 156, the discount assistance module 180, or another portion of the service provider computer 106 parses the adjudicated prescription claim transaction response 206 and identifies the code in the field associated with the transaction response. The service provider computer 106 compares that identified code to a table of transaction response codes in, for example, the database 182 or the data files 148 to determine the transaction response from the pharmacy claims processor computer 108 to identify a match. If the transaction response by the pharmacy claims processor computer 108 is that the prescription claim transaction 204 is approved or paid, the YES branch is followed to step 346. On the other hand, if the transaction response for the prescription claim transaction 204 was denied (rejected) or not paid, the NO branch is followed to step 382.

In step 346, the discount evaluation module 180 or another portion of the service provider computer 106 can identify a value or amount (the "total amount paid") in the Total Amount Paid field in the adjudicated prescription claim transaction response 206. In certain example embodiments, the Total Amount Paid field is where the pharmacy claims processor computer 108 inputs the amount of the cost of the medication, product, or service that will be covered by the pharmacy claims processor associated with the pharmacy claims processor computer 108. For example, the discount evaluation module 180 may parse the adjudicated prescription claim transaction response 206 to determine the total amount paid value or amount in the Total Amount Paid field of the adjudicated prescription claim transaction response 206. In step 348, an inquiry is conducted to determine if the total amount paid value or amount identified in the Total Amount Paid field is less than or equal to zero. In one example, the inquiry is conducted to determine if the patient's pharmacy benefit is funded (greater than zero) (e.g., the pharmacy claims processor and potentially the patient are paying at least a portion of the price for the product or service) or unfunded (less than or equal to zero) (e.g., the patient is paying the price for the product or service and potentially a portion of the price paid by the patient is applied to a deductible amount for the patient). In one example embodiment, the determination can be made by the discount evaluation module 180 or another portion of the service provider computer 106. In one example, the discount evaluation module 180 may compare the identified total amount paid from the Total Amount Paid field to a zero value to determine if the amount is greater than the zero value. If the amount in the Total Amount Paid field is greater than zero, the NO branch is followed to step 382. On the other hand, if the amount from the Total Amount Paid field is zero or less than zero, then the YES branch is followed to step 350. In one example embodiment, the amount being zero or less than zero represents that a pharmacy claims processor associated with the pharmacy claims processor computer 108 will not be covering any portion of the medication, product, or service, often referred to as a cash transaction or cash customers.

In step 350, the discount evaluation module 180 or another portion of the service provider computer 106 can identify a value or amount in the amount applied to periodic deductible field in the adjudicated prescription claim transaction response 206. In certain example embodiments, the amount applied to periodic deductible field is where the pharmacy claims processor computer 108 inputs the amount of the cost of the medication, product, or service that will be covered by the patient and/or purchaser as part of a deductible amount that has to be reached before coverage or a different value of coverage kicks in for the patient. For example, the discount evaluation module 180 may parse the adjudicated prescription claim transaction response 206 to determine the value or amount in the amount applied to periodic deductible field of the adjudicated prescription claim transaction response 206. In step 352, an inquiry is conducted to determine if the value or amount identified in the amount applied to periodic deductible field is greater than zero. In one example embodiment, the determination can be made by the discount evaluation module 180 or another portion of the service provider computer 106. In one example, the discount evaluation module 180 may compare the identified value or amount from the amount applied to periodic deductible field to a zero value to determine if the amount is greater than the zero value. If the amount in the amount applied to periodic deductible field is greater than zero, the YES branch is followed to step 382. On the other hand, if the amount from the amount applied to periodic deductible field is zero, then the NO branch is followed to step 354.

In step 354, the discount evaluation module 180 or another portion of the service provider computer 106 can identify a value or amount in the Patient Pay Amount field in the adjudicated prescription claim transaction response 206. In certain example embodiments, the Patient Pay Amount field is where the pharmacy claims processor computer 108 inputs the patient pay amount that the patient has to pay for the medication, product, or service. For example, the discount evaluation module 180 may parse the adjudicated prescription claim transaction response 206 to determine the value or amount in the Patient Pay Amount field of the adjudicated prescription claim transaction response 206. In step 356, the discount evaluation module 180 or another portion of the service provider computer 106 can identify a value or amount in the Usual and Customary Charge field in the prescription claim transaction 204 and/or the adjudicated prescription claim transaction response 206. For example, pharmacies typically establish a Usual and Customary Charge amount that represents a price for a specific drug, product, or service and for a specific quantity, on a specific day, at a specific pharmacy location. The Usual and Customary price or amount is typically defined as the amount charged by the pharmacy to cash customers for the prescribed medication, product, or service exclusive of sales tax or other amounts claimed. In certain example embodiments, the amount or value in the Usual and Customary Charge field is input into the prescription claim transaction 204 by the pharmacy computer 104 and may also be included in the adjudicated prescription claim transaction response 206. For example, the discount evaluation module 180 may parse the prescription claim transaction 204 or the adjudicated prescription claim transaction response 206 to determine the value or amount in the Usual and Customary Charge field.

In step 358, the discount evaluation module 180 or another portion of the service provider computer 106 can compare the patient pay amount identified from the Patient Pay Amount field to the Usual and Customary Charge amount from the Usual and Customary Charge field to determine if the patient pay amount is less than or equal to the Usual and Customary Charge amount. For example, the adjudicated prescription claim transaction response 206 can be audited to determine if the patient would save money and the pharmacy would make more money if the pharmacy charged the Usual and Customary Charge amount (cash price) or if the patient would save money and the pharmacy would make more money from the patient pay amount identified in the adjudicated prescription claim transaction response 206.

In step 360, an inquiry is conducted to determine if the patient pay amount is less than or equal to the Usual and Customary Charge amount based on the comparison of the two. In one example, the determination can be made by the discount evaluation module 180 or another portion of the service provider computer 106. If the patient pay amount is less than or equal to the Usual and Customary Charge amount, the YES branch is followed to step 382. If the patient pay amount is greater than the Usual and Customary Charge amount, the NO branch is followed to step 364.

In step 364, the discount evaluation module 180 or another portion of the service provider computer 106 creates or otherwise generates a reversal transaction 208 to reverse the adjudicated prescription claim transaction response 206. In one example embodiment, at least a portion of the information from the prescription claim transaction 204 and/or adjudicated prescription claim transaction response 206 is retrieved by the discount evaluation module 180 and input into the reversal transaction. In one example, embodiment, the reversal transaction 208 can include all or a portion of the fields identified above in the prescription claim transaction 204 and adjudicated prescription claim transaction response 206. In step 366, the service provider computer 106 can transmit the reversal transaction 208 to the pharmacy claims processor computer 108 identified by the payor identifier in the transaction 204. In one example, the reversal transaction 208 is transmitted from the service provider computer 106 to the pharmacy claims processor computer 108 via the network 110. The reversal transaction 208 is generated by the discount evaluation module 180 or another portion of the service provider computer 106 before the adjudicated prescription claim transaction response 206 is transmitted to the pharmacy computer 104 and without prior instructions from the pharmacy computer 104 or any employee of the associated pharmacy.

The pharmacy claims processor computer 108 receives and adjudicates the reversal transaction 208 in step 368 to reverse the adjudicated prescription claim transaction response 206 and to generate an adjudication 210 as to whether the reversal transaction 208 is approved or rejected. In certain exemplary embodiments, the transaction responses can be input into a field of the reversal transaction 208 that is recognized by the service provider computer 106. In step 370, the pharmacy claims processor computer 108 transmits the adjudicated reversal transaction response 210 to the service provider computer 106 via, for example, the network 110. The service provider computer 106 receives the adjudicated reversal transaction response 210 from the pharmacy claims processor computer 108 in step 372. In step 374, an inquiry is conducted to determine if the adjudicated reversal transaction response 210 has a transaction response indicating that the reversal transaction 208 was approved. In one exemplary embodiment, the service provider module 156, the discount assistance module 180, or another portion of the service provider computer 106 parses the adjudicated reversal transaction response 210 and identifies the code in the field associated with the transaction response. The service provider computer 106 compares that identified code to a table of transaction response codes in, for example, the database 182 or the data files 148 to determine the transaction response from the pharmacy claims processor computer 108 to identify a match. If the transaction response by the pharmacy claims processor computer 108 is that the reversal transaction 208 is approved, the YES branch is followed to step 376. On the other hand, if the transaction response for the reversal transaction 208 was denied (rejected), the NO branch is followed to step 382.

In step 376, the discount evaluation module 180 or another portion of the service provider computer 106 creates or otherwise generates a rejected adjudicated prescription claim transaction response 212 to reject the prescription claim transaction 204. In one example embodiment, at least a portion of the information from the prescription claim transaction 204 and/or adjudicated prescription claim transaction response 206 is retrieved by the discount evaluation module 180 and input into the rejected adjudicated prescription claim transaction response 212. In one example, embodiment, the rejected adjudicated prescription claim transaction response 212 can include all or a portion of the fields identified above in the prescription claim transaction 204 and adjudicated prescription claim transaction response 206. The rejected adjudicated prescription claim transaction response 212 may also include a reject code that identifies that the prescription claim transaction 204 is being rejected due to auditing of the adjudicated prescription claim transaction response 206 and determining that the pharmacy would receive the same or less money from the patient pay amount that the pharmacy would receive based on its Usual and Customary Charge amount for the requested medication, product, or service. Alternatively, the discount evaluation module or another portion of the service provider computer 106 can modify the adjudicated prescription claim transaction response 206 from an approved response 206 to a rejected response 212 and can include the reject code described above in the rejected adjudicated prescription claim transaction response 212.

In addition to the creation of or modification to the rejected prescription claim transaction response 212, in certain example embodiments, the discount evaluation module 180 or another portion of the service provider computer 106 may also create and/or retrieve and insert a custom message into a predetermined text field of the rejected prescription claim transaction response 212. For example, the custom message may include information as to why the prescription claim transaction 204 was rejected (e.g., the patient pay amount was not less than the Usual and Customary Charge amount for the particular pharmacy).

In an alternative embodiment, the discount evaluation module 180 or another portion of the service provider computer 106 may convert the adjudicated prescription claim transaction response 206 to a rejected adjudicated prescription claim transaction response 212 or otherwise creates or generates a rejected adjudicated prescription claim transaction response 212 to reject the prescription claim transaction 204 based at least in part on the determination that the patient pay amount is not less than the Usual and Customary Charge amount in step 362 and the NO branch could be followed initially to step 376. In this alternative embodiment, steps 364-374 may occur at a later time after steps 376-380, which include the creation of or conversion to the rejected adjudicated prescription claim transaction response 212 and the transmission of the response 212 to the pharmacy computer 104, have been completed. Thus, in this alternative embodiment, the creation of or conversion to the rejected prescription claim transaction response 212 would not be based on whether or not the reversal transaction was approved.

In step 378, the service provider computer 106 can transmit the rejected adjudicated prescription claim transaction response 212 to the pharmacy computer 104 from which it received the prescription claim transaction 204. In one example, the rejected adjudicated prescription claim transaction response 212 is transmitted from the service provider computer 106 to the pharmacy computer 104 via the network 110. In step 380, the rejected adjudicated prescription claim transaction response 212 that was created by the service provider computer 106 or discount evaluation module 180 or modified from an approved 206 to a rejected response 212 is received by the pharmacy computer 104. The process then continues to the END step.

Returning to step 382, the service provider computer 106 transmits the adjudicated prescription claim transaction response 206 to the pharmacy computer 104. In one exemplary embodiment, the adjudication prescription claim transaction response 206 is transmitted to the pharmacy computer 104 from the service provider computer 106 via the network 110. The adjudicated prescription claim transaction response 206 is received by the pharmacy computer 104 in step 384. If the transaction 204 was approved/paid and the parties agree to the financial requirements set forth in the response, the pharmacist or other pharmacy employee may dispense the medication to the patient in step 386. If the transaction 204 was denied/rejected, the pharmacist or other pharmacy employee may inform the patient of the denial/rejection and the basis for the denial/rejection included in the adjudicated prescription claim transaction response 206 in step 386. The process then continues to the END step.

Figure 4A:
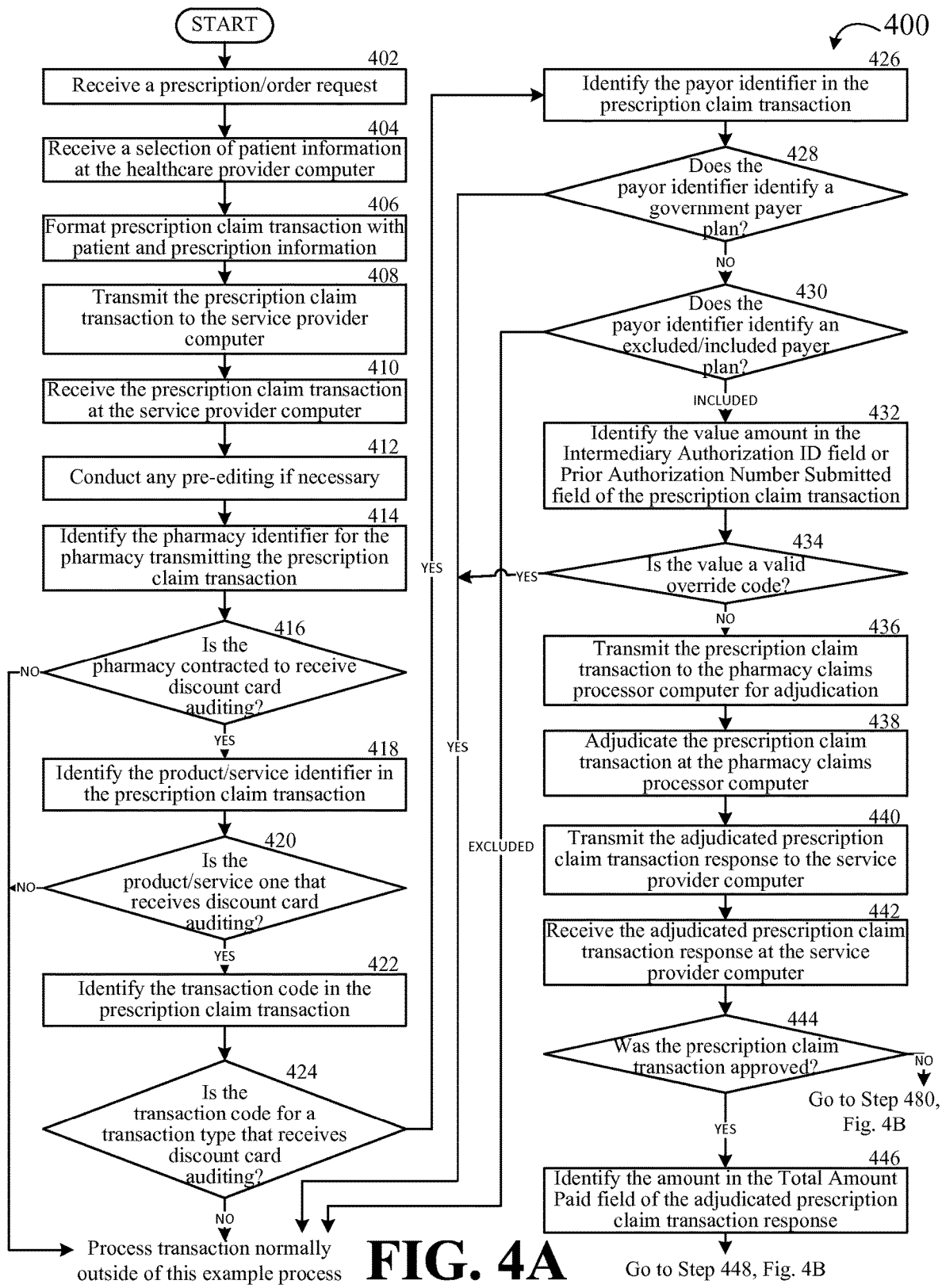
FIGS. 4A and 4B are a flow chart of another example method for auditing of pharmacy income potential for discount card-based purchases based on an evaluation of the data in the healthcare claim transaction and as part of the processing of a healthcare claim transaction, in accordance with another exemplary embodiment.
Figure 4B:
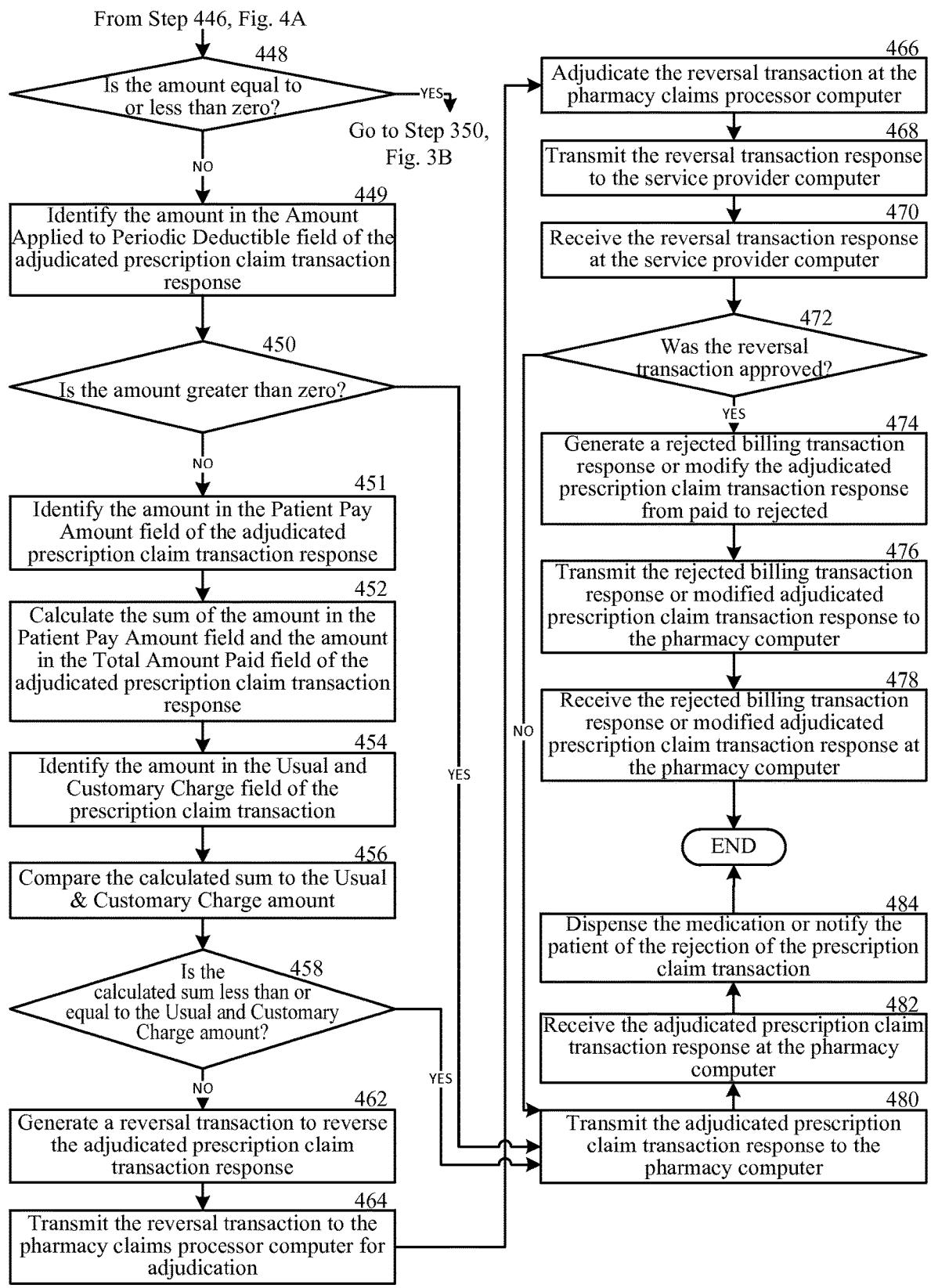

FIGS. 4A-4B are flow charts of another example method 400 for auditing of pharmacy income potential for discount card-based purchases based on an evaluation of the data in the healthcare claim transaction and as part of the processing of the healthcare claim transaction, such as a prescription claim transaction, prescription billing request, or medical claim transaction, in accordance with one exemplary embodiment. The exemplary method 400, described below, may be performed by a suitable service provider computer 106 and/or discount evaluation module 180.

Referring now to FIGS. 1, 2A, 4A and 4B, the exemplary method 400 begins at the START step and proceeds to step 402, where a prescription/order request 202 is received. In one example embodiment, the prescription/order request 202 is received by a pharmacist at a pharmacy. The prescription/order request 202 may be received from a patient, another healthcare provider prescribing a medication or service (e.g., physician, hospital, etc.), by phone, via the Internet, via an electronic prescription (i.e., electronic prescription order transaction, e-script, or e-prescription) or by way of an electronic system order. For example, the prescription 202 may be received by the patient from a prescriber of the medication, such as a doctor, dentist, nurse, or physician's assistant. The patient may go to the location of the pharmacy and physically hand the prescription request 202 to the pharmacist or make a request via a web portal communicably coupled to the healthcare provider computer 104 or an IVR communicably coupled or otherwise providing order data to the pharmacy computer 104. The pharmacist determines the patient's name and accesses the pharmacy computer 104, which receives a selection of patient information from the pharmacist via the I/O interface 128 in step 404. For example, the pharmacist accesses the pharmacy computer 104 and accesses a database of patient information, which may be stored in memory 126 or in another database either local or remote from the pharmacy computer 104. The pharmacist can then select the name or other patient identification information in the patient information database that matches the name or other identification information of the patient. In certain example embodiments, this information from the database includes the payor identifier for the transaction, such as the Payor ID/routing information (e.g., BIN Number, BIN Number and PCN, and/or BIN Number and Group ID) that identifies the pharmacy claims processor computer 108 intended to receive and adjudicate the prescription claim transaction 204.

In step 406, a prescription claim transaction 204 is generated and/or formatted at the pharmacy computer 104. In certain exemplary embodiments, the pharmacy computer 104 formats the prescription claim transaction 204 with patient information, payor identifier information, and prescribed product (e.g., medications, devices, etc.) or service information. The information can be input into the prescription claim transaction 204 by the pharmacist via the I/O interface 128 or automatically retrieved and entered by the pharmacy computer 104 based at least in part on historical transaction information for the patient in the data files 132 or a database communicably coupled to the pharmacy computer 104. According to one example embodiment, the prescription claim transaction 204 may be formatted in accordance with a version of the National Council for Prescription Drug Programs (NCPDP) Telecommunication Standard, although other standards may be utilized as well.

As discussed above, the prescription claim transaction 204 may include a BIN Number, a BIN Number and PCN, and/or a BIN Number and Group ID for identifying a particular pharmacy claims processor computer (i.e., PBM, healthcare insurance company, Medicare or other government healthcare insurance payor, Medicare Part D provider, etc.), such as the pharmacy claims processor computer 108, as a destination for the prescription claim transaction 204. In addition, the prescription claim transaction 204 may also include information relating to the patient, payor, prescriber, healthcare provider, and/or the requested medication. As an example, the prescription claim transaction 204 may include one or more of the following information:

Payor identifier—Payor ID/Routing Information
BIN Number (i.e. Banking Identification Number), BIN Number and Processor Control Number (PCN) and/or BIN Number and Group ID, that designates a destination (e.g., the pharmacy claims processor computer 108) of the prescription claim transaction 204
Patient Information
Name (e.g. Patient Last Name, Patient First Name, etc.)
Date of Birth of Patient
Age of Patient
Gender
Patient Address (e.g. Street Address, Zip Code, etc.)
Patient Contact Information (e.g. patient telephone number, email address, etc.)
Patient Health Condition Information
Patient ID or other identifier (e.g., Health Insurance Claim Number (HICN), social security number, etc.)
Insurance/Coverage Information
Cardholder Name (e.g. Cardholder First Name, Cardholder Last Name)
Cardholder ID and/or other identifier (e.g. person code)
Group ID and/or Group Information
Prescriber Information
Primary Care Provider ID or other identifier (e.g. NPI code)
Primary Care Provider Name (e.g. Last Name, First Name)
Prescriber ID or other identifier (e.g. NPI code, DEA number)
Prescriber Name (e.g. Last Name, First Name)
Prescriber Contact Information (e.g. Telephone Number)
Pharmacy or other Healthcare Provider Information (e.g. store name, chain identifier, etc.)
Pharmacy or other Healthcare Provider ID (e.g. NPI code)
Claim Information
Medication, service, or product information—Product (medication or device) or service identifier (e.g. National Drug Code (NDC) code, RxNorm code, etc.), product or service name, etc.
Prescription/Service Reference Number
Date Prescription Written
Quantity Dispensed
Days' Supply
Diagnosis/Condition (e.g., diagnosis code)
Pricing information for the drug/service/product (e.g. ingredient cost (e.g., in an Ingredient Cost field), dispensing fee (e.g., in a Dispensing Fee field), gross amount due (e.g., in a Gross Amount Due field), and Usual and Customary Charge amount (e.g., in a Usual and Customary Charge field))
Number of Refills Authorized
One or more NCPDP Message Fields
One or more Drug Utilization (DUR) Codes
Date of Service.

The prescription claim transaction 204 can be used to determine if the pharmacy claims processor associated with the pharmacy claims processor computer 108 approves or rejects payment coverage for medication, product, or service being requested in the prescription claim transaction 204 and, if approved, the amount the pharmacy claims processor will cover (or pay) for the medication, product, or service being requested and how much the patient pay amount (the amount the patient is responsible to pay for) will be.

The pharmacy computer 104 transmits the prescription claim transaction 204 to the service provider computer 106 in step 408. In step 410, the service provider computer 106 receives the prescription claim transaction 204. For example, the prescription claim transaction 204 can be transmitted by the pharmacy computer 104 to the service provider computer 106 through the network 110. The service provider computer 106 conducts any pre-editing, if necessary, on the prescription claim transaction 204 in step 412. The pre-edits may include verifying, adding, and/or editing information included in the prescription claim transaction 204 prior to it being communicated to a pharmacy claims processor computer 108. For example, the service provider computer 106 can parse the prescription claim transaction 204 to determine/edit the financial fields, the service code, the quantity dispensed, and or the Days' Supply of the product. In addition, the service provider computer 106 can determine whether non-insurance related financial assistance, (e.g., an incentive program, such as a coupon, voucher, rebate, discount, loyalty award, or other equivalent non-insurance benefit or the like) is available for the patient and/or prescribed product (e.g., medications, devices, etc.)

or service identified in the prescription claim transaction 204. In addition, the discount evaluation module 156 or another portion of the service provider computer 106 can determine if the prescription claim transaction 204 is for a discount card based healthcare purchase. For example, the discount evaluation module can compare the BIN Number, BIN Number and PCN, or BIN Number and Group ID parsed and identified from the prescription claim transaction 204 to a table, list, or schedule of BIN Numbers, BIN Numbers and PCNs, or BIN Numbers and Group IDs, that identify discount card purchase programs. Based on a match, of the BIN Number, BIN Number and PCN, or BIN Number and Group ID from the prescription claim transaction 204 to at least one of the table, list, or schedule of BIN Numbers, BIN Numbers and PCNs, or BIN Numbers and Group IDs, the discount evaluation module 156 can determine that the prescription claim transaction 204 is for a purchase under a discount card program.

In step 414, the discount evaluation module 156 or another portion of the service provider computer 106 can identify the pharmacy identifier in the prescription claim transaction 204. For example, the discount evaluation module 180 may parse the prescription claim transaction 204 to determine the pharmacy identifier (e.g., NPI code, pharmacy name, pharmacy address) in a predetermined field of the prescription claim transaction 204. In step 416, an inquiry is conducted to determine if the pharmacy identified by the pharmacy identifier in the prescription claim transaction 204 has contracted with the service provider associated with the service provider computer 106 to receive auditing services of adjudicated healthcare claim transactions for discount card-based healthcare purchases. In one example embodiment, the determination can be made by the discount evaluation module 180 or another portion of the service provider computer 106 (e.g., the service provider module 156). In one example, the discount evaluation module 180 may compare the identified pharmacy identifier from the prescription claim transaction 204 to a table, schedule, or listing of records containing pharmacy identifiers in, for example, the database 182 or the data files 148 for pharmacies or pharmacy chains that have contracted to receive auditing services of adjudicated healthcare claim transactions for discount card-based healthcare purchases to determine if a match of pharmacy identifiers exists. If a match does not exist and the pharmacy has not contracted to receive auditing services of adjudicated healthcare claim transactions for discount card-based healthcare purchases, the NO branch is followed out of the current example process and the prescription claim transaction 204 is processed in a standard manner. If a match does exist and the pharmacy has contracted to receive auditing services of adjudicated healthcare claim transactions for discount card-based healthcare purchases, then the YES branch is followed to step 418.

In step 418, the discount evaluation module 180 or another portion of the service provider computer 106 can identify the prescribed product (e.g., medications, devices, etc.) or service identifier in the prescription claim transaction 204. For example, the discount evaluation module 180 may parse the prescription claim transaction 204 to determine the prescribed product (e.g., medications, devices, etc.) or service identifier (e.g., NDC code, RxNorm code, medication/product/service name) in a predetermined field of the prescription claim transaction 204. In step 420, an inquiry is conducted to determine if the medication or product identified in the prescription claim transaction 204 qualifies for auditing services of adjudicated healthcare claim transactions for discount card-based healthcare purchases. In one example embodiment, the determination can be made by the discount evaluation module 180 or another portion of the service provider computer 106. In one example, the discount evaluation module 180 may compare the identified prescribed product or service identifier from the prescription claim transaction 204 to a table, schedule, or listing of records containing prescribed product and/or service identifiers in, for example, the database 182 or the data files 148 for medications, products, or services that receive auditing services of adjudicated healthcare claim transactions for discount card-based healthcare purchases to determine if a match of medication identifiers exists. If a match does not exist and the medication, product, or service does not receive auditing services of adjudicated healthcare claim transactions for discount card-based healthcare purchases, the NO branch is followed out of the current example process and the prescription claim transaction 204 is processed in a standard manner. If a match does exist and the medication, product, or service does receive auditing services of adjudicated healthcare claim transactions for discount card-based healthcare purchases, the YES branch is followed to step 422.

In step 422, the discount evaluation module 180 or another portion of the service provider computer 106 can identify the transaction code identifying the transaction type (e.g., a prescription claim transaction, prescription billing request, or medical claim transaction) in the prescription claim transaction 204. For example, the discount evaluation module 180 may parse the prescription claim transaction 204 to determine the transaction code in a predetermined field of the prescription claim transaction 204. In step 424, an inquiry is conducted to determine if the transaction type identified in the prescription claim transaction 204 qualifies for auditing services of adjudicated healthcare claim transactions for discount card-based healthcare purchases. In one example embodiment, the determination can be made by the discount evaluation module 180 or another portion of the service provider computer 106. In one example, the discount evaluation module 180 may compare the identified transaction code from the prescription claim transaction 204 to a table, schedule, or listing of records containing transaction codes in, for example, the database 182 or the data files 148 for transaction types that receive auditing services of adjudicated healthcare claim transactions for discount card-based healthcare purchases to determine if a match of transaction codes exists. In one example embodiment, the transaction types that receive auditing services of adjudicated healthcare claim transactions for discount card-based healthcare purchases are healthcare claim transactions (e.g., prescription claim transactions), prescription billing requests, and healthcare order transactions. If a match does not exist and the particular transaction type does not receive auditing services of adjudicated healthcare claim transactions for discount card-based healthcare purchases, the NO branch is followed out of the current example process and the prescription claim transaction 204 is processed in a standard manner. If a match does exist and the transaction type identified by the transaction code does receive auditing services of adjudicated healthcare claim transactions for discount card-based healthcare purchases, the YES branch is followed to step 426.

In step 426, the discount evaluation module 180 or another portion of the service provider computer 106 can identify the payor identifier (e.g., identifier that designates the pharmacy claims processor computer 108 to adjudicate the prescription claim transaction 204 (e.g., BIN Number, BIN Number and PCN, or BIN Number and Group ID) in the prescription claim transaction 204. For example, the discount evaluation module 156 may parse the prescription claim transaction 204 to determine the payor identifier in a predetermined field of the prescription claim transaction 204. In step 428, an inquiry is conducted to determine if the payor identifier in the prescription claim transaction 204 identifies a government payer healthcare insurance plan. Examples of government payer healthcare insurance plans include government-funded healthcare insurance program, such as Medicare, Medicaid, or other government healthcare insurance program. In one example embodiment, the determination can be made by the discount evaluation module 180 or another portion of the service provider computer 106. In one example, the discount evaluation module 180 may compare the identified payor identifier from the prescription claim transaction 204 to a table, schedule, or listing of records containing payor identifiers in, for example, the database 182 or the data files 148 for payors/claims processors that are Medicare, Medicaid, another government-funded healthcare insurance program to determine if a match of payor identifiers exists. If a match does not exist the NO branch is followed to step 430. If a match does exist, then the YES branch is followed out of the current example process and the prescription claim transaction 204 is processed in a standard manner.

In step 430, an inquiry is conducted to determine if the payor identifier in the prescription claim transaction 204 identifies a pharmacy claims processor that is specifically included or excluded from receiving auditing services of adjudicated healthcare claim transactions for discount card-based healthcare purchases. For example, the system may be set up to optionally have and excluded list, an included list, or both for pharmacy claims processors that are or are not to receive auditing services of adjudicated healthcare claim transactions for discount card-based healthcare purchases. For example, there may be certain pharmacy claims processors, in addition to pharmacy claims processors for government-funded insurance plans, that are not to receive auditing services of adjudicated healthcare claim transactions for discount card-based healthcare purchases. Similarly, there may be certain plans that were previously exclude but are intended to receive auditing services of adjudicated healthcare claim transactions for discount card-based healthcare purchases, and are thus, within the included list. In one example embodiment, the determination can be made by the discount evaluation module 180 or another portion of the service provider computer 106. In one example, the discount evaluation module 180 may compare the identified payor identifier from the prescription claim transaction 204 to a table, schedule, or listing of records containing payor identifiers in, for example, the database 182 or the data files 148 for payors/claims processors that are either intended to be included or excluded from receiving auditing services of adjudicated healthcare claim transactions for discount card-based healthcare purchases to determine if a match of payor identifiers exists. If the list is an exclusion list and a match does exist the EXCLUDED branch is followed out of the current example process and the prescription claim transaction 204 is processed in a standard manner. Otherwise, if a match to the exclusion list is not made, then the INCLUDED branch is followed to step 432. Similarly, if the list is an inclusion list and a match does exist the INCLUDED branch is followed to step 432. Otherwise, if a match to the inclusion list is not made, then the EXCLUDED branch is followed out of the current example process and the prescription claim transaction 204 is processed in a standard manner.

In step 432, the discount evaluation module 180 or another portion of the service provider computer 106 can identify a value or amount in the Intermediary Authorization ID field, the Prior Authorization Number Submitted field, or another mutually agreed upon field in the prescription claim transaction 204. In certain example embodiments, these fields are where a pharmacy may enter an override code to override or prevent receiving auditing services of adjudicated healthcare claim transactions for discount card-based healthcare purchases. For example, the discount evaluation module 180 may parse the prescription claim transaction 204 to determine the value or amount in the Intermediary Authorization ID field, Prior Authorization Number Submitted field, or another mutually agreed upon field of the prescription claim transaction 204. In step 434, an inquiry is conducted to determine if the value or amount identified in the Intermediary Authorization ID field, Prior Authorization Number Submitted field, or the other mutually agreed upon field of the prescription claim transaction 204 is a valid override code. In one example embodiment, the determination can be made by the discount evaluation module 180 or another portion of the service provider computer 106. In one example, the discount evaluation module 180 may compare the identified value or amount from the Intermediary Authorization ID field, Prior Authorization Number Submitted field, or the other mutually agreed upon field of the prescription claim transaction 204 to a table, schedule, or listing of records containing valid override codes in, for example, the database 182 or the data files 148 to determine if a match of override codes exists. If a match does not exist, the NO branch is followed to step 436. If a match does exist, the YES branch is followed out of the current example process and the prescription claim transaction 204 is processed in a standard manner.

The service provider computer 106 transmits the prescription claim transaction 204 to the pharmacy claims processor computer 108 in step 436. For example, a prescription claim transaction 204 can be transmitted from the service provider computer 106 to the pharmacy claims processor computer 108 via the network 110. The pharmacy claims processor computer 108 receives and adjudicates the prescription claim transaction 204 in step 438 to determine if the patient has coverage, to determine to what extent the patient's coverage covers the requested medication, product, or service identified in the transaction 204, and to generate an adjudication 206 as to whether the transaction 204 is approved/paid or rejected/denied. Example transaction responses in the adjudicated prescription claim transaction response 206 can include, but are not limited to, accepted, approved, paid, captured, denied (e.g., rejected), and denied (e.g., rejected) with request for additional information and resubmission. In certain exemplary embodiments, the transaction responses can be input into a field of the prescription claim transaction 204 that is recognized by the service provider computer 106 and/or the pharmacy computer 104. Typically, if the transaction response for the transaction 204 is approved, the adjudicated prescription claim transaction response 206 provides the amount of the cost of the medication, product, or service that will be covered by the pharmacy claims processor associated with the pharmacy claims processor computer 108 (the total amount paid, which is provided in the Total Amount Paid field of the adjudicated prescription claim transaction response 206), any amount applied to a patient deductible which is provided in the amount applied to periodic deductible field of the adjudicated prescription claim transaction response 206), and the patient pay amount (which is provided in the Patient Pay Amount field of the adjudicated prescription claim transaction response 206) and if the transaction response is a rejection, the adjudicated response 206 provides the reason for the rejection (e.g., in the form of a reject code, for example, patient not covered, Cardholder ID submitted in the transaction is inactive, prior authorization required, medication not covered, etc.).

In step 440, the pharmacy claims processor computer 108 transmits the adjudicated prescription claim transaction response 206 to the service provider computer 106 via, for example, the network 110. The service provider computer 106 receives the adjudicated prescription claim transaction response 206 from the pharmacy claims processor computer 108 in step 442. In step 444, an inquiry is conducted to determine if the adjudicated prescription claim transaction response 206 has a transaction response indicating that the transaction 204 was approved or paid. In one exemplary embodiment, the service provider module 156, the discount assistance module 180, or another portion of the service provider computer 106 parses the adjudicated prescription claim transaction response 206 and identifies the code in the field associated with the transaction response. The service provider computer 106 compares that identified code to a table of transaction response codes in, for example, the database 182 or the data files 148 to determine the transaction response from the pharmacy claims processor computer 108 to identify a match. If the transaction response by the pharmacy claims processor computer 108 is that the prescription claim transaction 204 is approved or paid, the YES branch is followed to step 446. On the other hand, if the transaction response for the prescription claim transaction 204 was denied (rejected) or not paid, the NO branch is followed to step 482.

In step 446, the discount evaluation module 180 or another portion of the service provider computer 106 can identify a value or amount (the "total amount paid") in the Total Amount Paid field in the adjudicated prescription claim transaction response 206. As discussed above, the Total Amount Paid field is typically where the pharmacy claims processor computer 108 inputs the amount of the cost of the medication, product, or service that will be covered by the pharmacy claims processor associated with the pharmacy claims processor computer 108. For example, the discount evaluation module 180 may parse the adjudicated prescription claim transaction response 206 to determine the total amount paid value or amount in the Total Amount Paid field of the adjudicated prescription claim transaction response 206. In step 448, an inquiry is conducted to determine if the total amount paid value or amount identified in the Total Amount Paid field is less than or equal to zero. In one example, the inquiry is conducted to determine if the patient's pharmacy benefit is funded (greater than zero) (e.g., the pharmacy claims processor and potentially the patient are paying at least a portion of the price for the product or service) or unfunded (less than or equal to zero) (e.g., the patient is paying the price for the product or service and potentially a portion of the price paid by the patient is applied to a deductible amount for the patient). In one example embodiment, the determination can be made by the discount evaluation module 180 or another portion of the service provider computer 106. In one example, the discount evaluation module 180 may compare the identified total amount paid value or amount from the Total Amount Paid field to a zero value to determine if the amount is greater than the zero value. If the amount in the Total Amount Paid field is greater than zero, the NO branch is followed to step 450. On the other hand, if the amount from the Total Amount Paid field is zero or less than zero, then the YES branch is followed to step 350 of FIG. 3B.

In step 449, the discount evaluation module 180 or another portion of the service provider computer 106 can identify a value or amount in the amount applied to periodic deductible field in the adjudicated prescription claim transaction response 206. In certain example embodiments, the amount applied to periodic deductible field is where the pharmacy claims processor computer 108 inputs the amount of the cost of the medication, product, or service that will be covered by the patient and/or purchaser as part of a deductible amount that has to be reached before coverage or a different value of coverage kicks in for the patient. For example, the discount evaluation module 180 may parse the adjudicated prescription claim transaction response 206 to determine the value or amount in the amount applied to periodic deductible field of the adjudicated prescription claim transaction response 206. In step 450, an inquiry is conducted to determine if the value or amount identified in the amount applied to periodic deductible field is greater than zero. In one example embodiment, the determination can be made by the discount evaluation module 180 or another portion of the service provider computer 106. In one example, the discount evaluation module 180 may compare the identified value or amount from the amount applied to periodic deductible field to a zero value to determine if the amount is greater than the zero value. If the amount in the amount applied to periodic deductible field is greater than zero, the YES branch is followed to step 480. On the other hand, if the amount from the amount applied to periodic deductible field is zero, then the NO branch is followed to step 451.

In step 451, the discount evaluation module 180 or another portion of the service provider computer 106 can identify a value or amount in the Patient Pay Amount field in the adjudicated prescription claim transaction response 206. As discussed above, in certain example embodiments, the Patient Pay Amount field is where the pharmacy claims processor computer 108 inputs the patient pay amount that the patient has to pay for the medication, product, or service. For example, the discount evaluation module 180 may parse the adjudicated prescription claim transaction response 206 to determine the value or amount in the Patient Pay Amount field of the adjudicated prescription claim transaction response 206. In step 452, the discount evaluation module 180 or another portion of the service provider computer 106 can calculate the sum of the identified total amount paid value or amount from the Total Amount Paid field and the identified patient pay amount from the Patient Pay Amount field.

In step 454, the discount evaluation module 180 or another portion of the service provider computer 106 can identify a value or amount in the Usual and Customary Charge field in the prescription claim transaction 204 and/or the adjudicated prescription claim transaction response 206. As discussed above, pharmacies typically establish a Usual and Customary Charge amount that represents a price for a specific drug, product, or service and for a specific quantity, on a specific day, at a specific pharmacy location. The Usual and Customary Charge price or amount is typically defined as the amount charged by the pharmacy to cash customers for the prescribed medication, product, or service exclusive of sales tax or other amounts claimed. In certain example embodiments, the amount or value in the Usual and Customary Charge field is input into the prescription claim transaction 204 by the pharmacy computer 104 and may also be included in the adjudicated prescription claim transaction response 206. For example, the discount evaluation module 180 may parse the prescription claim transaction 204 or the adjudicated prescription claim transaction response 206 to determine the value or amount in the Usual and Customary Charge field.

In step 456, the discount evaluation module 180 or another portion of the service provider computer 106 can compare the calculated sum of the identified total amount paid value or amount from the Total Amount Paid field and the identified patient pay amount from the Patient Pay Amount field to the Usual and Customary Charge amount from the Usual and Customary Charge field to determine if the calculated sum is less than or equal to the Usual and Customary Charge amount. For example, the adjudicated prescription claim transaction response 206 can be audited to determine if the patient would save money and the pharmacy would make more money if the pharmacy charged the Usual and Customary Charge amount (cash price) or if the patient would save money and the pharmacy would make more money from the sum of the patient pay amount plus the amount paid by the pharmacy claims processor associated with the pharmacy claims processor computer 108.

In step 458, an inquiry is conducted to determine if the calculated sum of the identified total amount paid value or amount from the Total Amount Paid field and the identified patient pay amount from the Patient Pay Amount field is less than or equal to the Usual and Customary Charge amount based on the comparison of the two. In one example, the determination can be made by the discount evaluation module 180 or another portion of the service provider computer 106. If the calculated sum is less than or equal to the Usual and Customary Charge amount, the YES branch is followed to step 480. If the calculated sum is greater than the Usual and Customary Charge amount, the NO branch is followed to step 462.

In step 462, the discount evaluation module 180 or another portion of the service provider computer 106 creates or otherwise generates a reversal transaction 208 to reverse the adjudicated prescription claim transaction response 206. In one example embodiment, at least a portion of the information from the prescription claim transaction 204 and/or adjudicated prescription claim transaction response 206 is retrieved by the discount evaluation module 180 and input into the reversal transaction 208. In one example, embodiment, the reversal transaction 208 can include all or a portion of the fields identified above in the prescription claim transaction 204 and adjudicated prescription claim transaction response 206. In step 464, the service provider computer 106 can transmit the reversal transaction 208 to the pharmacy claims processor computer 108 identified by the payor identifier in the transaction 204. In one example, the reversal transaction 208 is transmitted from the service provider computer 106 to the pharmacy claims processor computer 108 via the network 110. The reversal transaction 208 is generated by the discount evaluation module 180 or another portion of the service provider computer 106 before the adjudicated prescription claim transaction response 206 is transmitted to the pharmacy computer 104 and without prior instructions from the pharmacy computer 104 or any employee of the associated pharmacy.

The pharmacy claims processor computer 108 receives and adjudicates the reversal transaction 208 in step 466 to reverse the adjudicated prescription claim transaction response 206 and to generate an adjudication 210 as to whether the reversal transaction 208 is approved or rejected. In certain exemplary embodiments, the transaction responses can be input into a field of the reversal transaction 208 that is recognized by the service provider computer 106. In step 468, the pharmacy claims processor computer 108 transmits the adjudicated reversal transaction response 210 to the service provider computer 106 via, for example, the network 110. The service provider computer 106 receives the adjudicated reversal transaction response 210 from the pharmacy claims processor computer 108 in step 470. In step 472, an inquiry is conducted to determine if the adjudicated reversal transaction response 210 has a transaction response indicating that the reversal transaction 208 was approved. In one exemplary embodiment, the service provider module 156, the discount assistance module 180, or another portion of the service provider computer 106 parses the adjudicated reversal transaction response 210 and identifies the code in the field associated with the transaction response. The service provider computer 106 compares that identified code to a table of transaction response codes in, for example, the database 182 or the data files 148 to determine the transaction response from the pharmacy claims processor computer 108 to identify a match. If the transaction response by the pharmacy claims processor computer 108 is that the reversal transaction 208 is approved, the YES branch is followed to step 474. On the other hand, if the transaction response for the reversal transaction 208 was denied (rejected), the NO branch is followed to step 480.

In step 474, the discount evaluation module 180 or another portion of the service provider computer 106 creates or otherwise generates a rejected adjudicated prescription claim transaction response 212 to reject the prescription claim transaction 204. In one example embodiment, at least a portion of the information from the prescription claim transaction 204 and/or adjudicated prescription claim transaction response 206 is retrieved by the discount evaluation module 180 and input into the rejected adjudicated prescription claim transaction response 212. In one example, embodiment, the rejected adjudicated prescription claim transaction response 212 can include all or a portion of the fields identified above in the prescription claim transaction 204 and adjudicated prescription claim transaction response 206. The rejected adjudicated prescription claim transaction response 212 may also include a reject code that identifies that the prescription claim transaction 204 is being rejected due to auditing of the adjudicated prescription claim transaction response 206 and determining that the pharmacy would receive the same or less money from the combination of the amount paid by the pharmacy claims processor to the pharmacy and the patient pay amount that the pharmacy would receive as compared to its Usual and Customary Charge amount for the requested medication, product, or service. Alternatively, the discount evaluation module or another portion of the service provider computer 106 can modify the adjudicated prescription claim transaction response 206 from an approved response 206 to a rejected response 212 and can include the reject code described above in the rejected adjudicated prescription claim transaction response 212.

In addition to the creation of or modification to the rejected prescription claim transaction response 212, in certain example embodiments, the discount evaluation module 180 or another portion of the service provider computer 106 may also create and/or retrieve and insert a custom message into a predetermined text field of the rejected prescription claim transaction response 212. For example, the custom message may include information as to why the prescription claim transaction 204 was rejected (e.g., the calculated sum was not less than the Usual and Customary Charge amount for the particular pharmacy).

In an alternative embodiment, the discount evaluation module 180 or another portion of the service provider computer 106 may convert the adjudicated prescription claim transaction response 206 to a rejected adjudicated prescription claim transaction response 212 or otherwise creates or generates a rejected adjudicated prescription claim transaction response 212 to reject the prescription claim transaction 204 based at least in part on the determination that the calculated sum is not less than the Usual and Customary Charge amount in step 458 and the NO branch could be followed initially to step 474. In this alternative embodiment, steps 462-472 may occur at a later time after steps 474-478, which include the creation of or conversion to the rejected adjudicated prescription claim transaction response 212 and the transmission of the response 212 to the pharmacy computer 104, have been completed. Thus, in this alternative embodiment, the creation of or conversion to the rejected prescription claim transaction response 212 would not be based on whether or not the reversal transaction was approved.

In step 476, the service provider computer 106 can transmit the rejected adjudicated prescription claim transaction response 212 to the pharmacy computer 104 from which it received the prescription claim transaction 204. In one example, the rejected adjudicated prescription claim transaction response 212 is transmitted from the service provider computer 106 to the pharmacy computer 104 via the network 110. In step 478, the rejected adjudicated prescription claim transaction response 212 that was created by the service provider computer 106 or discount evaluation module 180 or modified from an approved 206 to a rejected response 212 is received by the pharmacy computer 104. The process then continues to the END step.

Returning to step 480, the service provider computer 106 transmits the adjudicated prescription claim transaction response 206 to the pharmacy computer 104. In one exemplary embodiment, the adjudication prescription claim transaction response 206 is transmitted to the pharmacy computer 104 from the service provider computer 106 via the network 110. The adjudicated prescription claim transaction response 206 is received by the pharmacy computer 104 in step 482. If the transaction 204 was approved/paid and the parties agree to the financial requirements set forth in the response, the pharmacist or other pharmacy employee may dispense the medication to the patient in step 484. If the transaction 204 was denied/rejected, the pharmacist or other pharmacy employee may inform the patient of the denial/rejection and the basis for the denial/rejection included in the adjudicated prescription claim transaction response 206 in step 484. The process then continues to the END step.

The methods described and shown in FIGS. 3A-4B may be carried out or performed in any suitable order as desired in various embodiments. Additionally, in certain exemplary embodiments, at least a portion of the operations may be carried out in parallel. Furthermore, in certain exemplary embodiments, less than or more than the operations described in FIGS. 3A-4B may be performed.

Figure 2B:
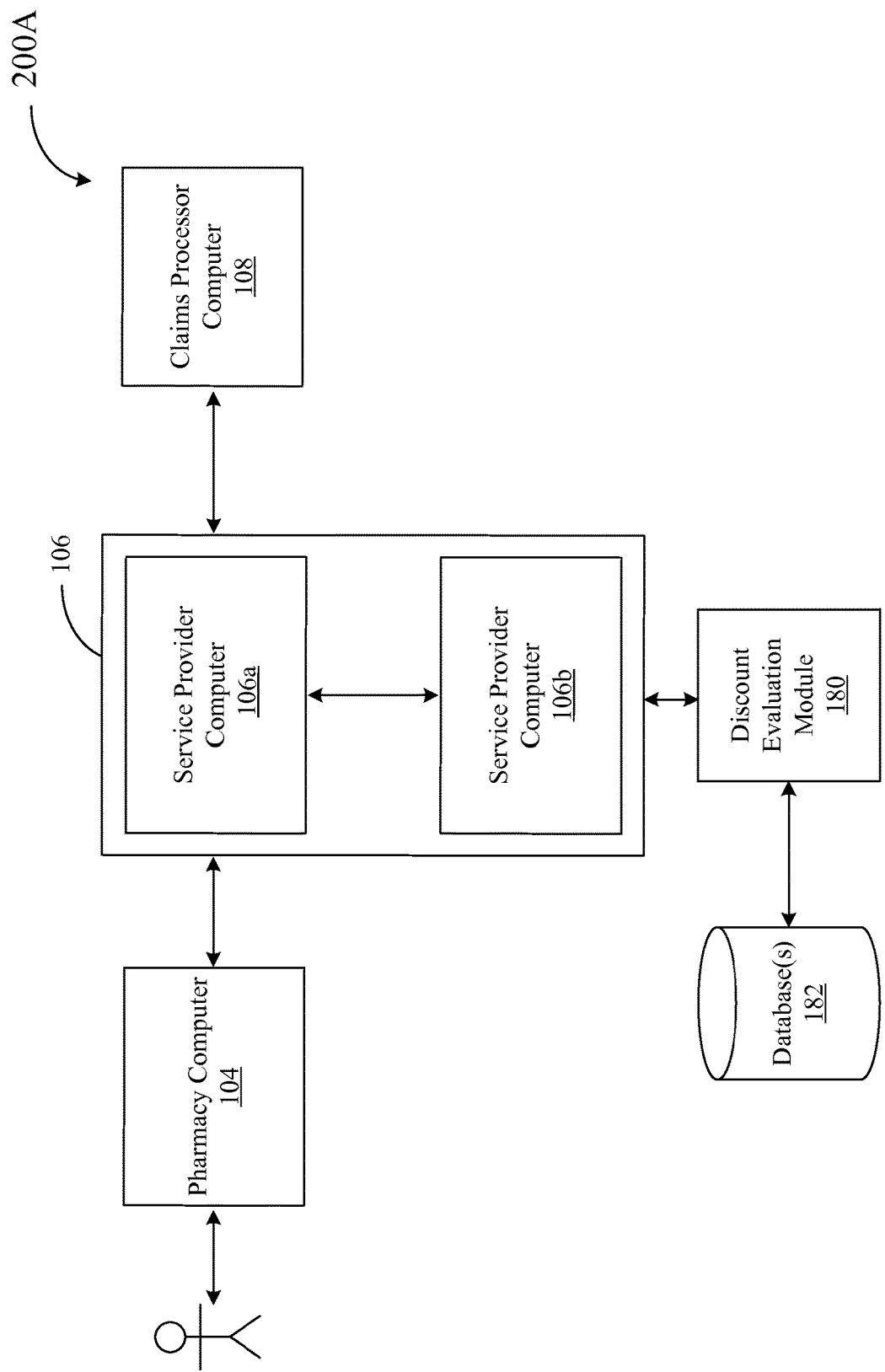
FIG. 2B is a diagram of another example data flow for auditing of pharmacy income potential for discount card-based purchases based on an evaluation of the data in the healthcare claim transaction and as part of the processing of a healthcare claim transaction processed through one or more service providers according to an alternative exemplary embodiment.

Likewise, while FIGS. 3A-4B have been described primarily in conjunction with FIG. 2A, it will be appreciated that variations of FIG. 2A are available. As shown by the system 200A of FIG. 2B, the service provider computer 106 may include two or more distinct service provider computers 106a and 106b that are in communication with each other. These distinct service provider computers 106a and 106b may be owned, operated, and/or located by the same or distinct and wholly-unrelated companies. The service provider computer 106a may be operative with the pharmacy computer 104, while the service provider computer 106b may be operative with other healthcare provider computers and/or other third-party entity computers. However, the service provider computer 106b may have a data processing arrangement with the service provider computer 106a. Under the data processing arrangement, the service provider computer 106a may be permitted to utilize or offer auditing services of the service provider computer 106b, including the operations and use of the discount evaluation module 180 and the data in the database 182 to audit healthcare claim transactions to determine pharmacy income potential for discount card-based purchases, as discussed above. Accordingly, the services accessible by the service provider computer 106b, may be available to the pharmacy computer 104 via the service provider computers 106a and 106b.

While certain example embodiments disclosed herein describe the discount evaluation module 180 as being separate of the service provider computer 106, in alternate embodiments, the discount evaluation module 180 or the functions that it completes may be part of the service provider computer 106. In those embodiments where the discount evaluation module 180 is incorporated into the service provider computer 106, and with regard to the methods described above, the elements describing transmitting or receiving between the service provider computer 106 and the discount evaluation module 180 may be internal transmissions within the service provider computer 106 or may be omitted altogether. Further, while the exemplary embodiments described herein disclose certain steps occurring at the service provider computer 106 and/or the discount evaluation module 180, in alternative embodiments those steps described with reference to FIGS. 1-4B may alternately be completed at a pharmacy computer 104, a claims processor computer 108, a discount evaluation module 180, any combination thereof, and/or a combination of those devices along with the service provider computer 106. In those alternate embodiments, certain transmission/receiving blocks described above with reference to FIGS. 1-4B may be omitted while others may be added, as understood by one or ordinary skill in the art. The intent being that, in alternate embodiments, any of the devices/computers discussed in FIG. 1 are capable of completing all or any part of the methods described with reference to FIGS. 2A-4B.

Accordingly, example embodiments disclosed herein can provide the technical effects of creating a system and method that provides real-time or near real time way to provide auditing services of adjudicated healthcare claim transactions for discount card-based healthcare purchases as part of or in-line with the processing of one or more types of healthcare claim transactions. In this regard, pharmacies will continue to be able to provide discount card based purchase services to patients without doing so at a financial loss.

Although example embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Furthermore, while various example implementations and architectures have been described in accordance with example embodiments of the disclosure, one of ordinary skill in the art will appreciate that numerous other modifications to the example implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and steps of the flow diagrams, and combinations of blocks in the block diagrams and steps of the flow diagrams, respectively, may be implemented by execution of computer-executable program instructions. Likewise, some blocks of the block diagrams and steps of the flow diagrams may not necessarily need to be performed in the order presented, or may not necessarily need to be performed at all, according to some embodiments. Further, additional components and/or operations beyond those depicted in blocks of the block and/or steps of the flow diagrams may be present in certain embodiments.

Accordingly, blocks of the block diagrams and steps of the flow diagrams support combinations of means for performing the specified functions, combinations of elements or steps for performing the specified functions and program instruction means for performing the specified functions. It will also be understood that each block of the block diagrams and step of the flow diagrams, and combinations of blocks in the block diagrams and steps of the flow diagrams, may be implemented by special-purpose, hardware-based computer systems that perform the specified functions, elements or steps, or combinations of special-purpose hardware and computer instructions.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or steps specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or steps specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although example embodiments have been described in language specific to structural features and/or methodological acts, it is to be understood that the disclosure is not necessarily limited to the specific features or acts described. Rather, the specific features and acts are disclosed as illustrative forms of implementing the example embodiments. Conditional language, such as, among others, "can," "could," "might," or "may," unless specifically stated otherwise, or otherwise understood within the context as used, is generally intended to convey that certain example embodiments could include, while other example embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method for providing feedback to a user interface of a pharmacy computer, regarding financial benefits of a cash transaction compared to a prescription claim transaction, the financial benefits reflecting financial benefits for a patient and a pharmacy, and the computer-implemented method comprising:

receiving, from a claims processor computer, and by a service provider computer associated with a service provider, an adjudicated prescription claim transaction response for the prescription claim transaction transmitted to the claims processor computer by the pharmacy computer, wherein the adjudicated prescription claim transaction response comprises a total amount paid by the pharmacy and a patient pay amount for a product/service being requested by a patient;

storing, by the service provider computer, in a routing table in a memory device, data indicative of the pharmacy computer from which the prescription claim transaction originated;

conducting an income audit evaluation for the prescription claim transaction by comparing the patient pay amount to a pharmacy usual and customary charge amount indicated in the prescription claim transaction to determine if the patient pay amount is less than the pharmacy usual and customary charge amount; and in an instance it is determined the patient pay amount is not less than the pharmacy usual and customary charge amount, transmitting, by the service provider computer, a reversal transaction to the claims processor computer to reverse an adjudicated prescription claim associated with the adjudicated prescription claim transaction response;

modifying, by the service provider computer, the adjudicated prescription claim transaction response to insert a message into a predetermined text field indicating a calculated sum is not less than the pharmacy usual and customary charge amount;

accessing the routing table to determine the pharmacy computer from which the prescription claim transaction originated; and transmitting, by the service provider computer, in real time or near real time relative to submission of the prescription claim transaction to the claims processor computer, the adjudicated prescription claim transaction response to the pharmacy computer, that when received and processed by the pharmacy computer, causes display of the message on the user interface of the pharmacy computer indicating that the pharmacy usual and customary charge amount is less than the patient pay amount provided by the pharmacy claims processor.

2. The computer-implemented method of claim 1, further comprising, prior to conducting the income audit evaluation:
identifying, by the service provider computer, the pharmacy usual and customary charge amount for the product/service being requested by the patient in the prescription claim transaction;
determining, by the service provider computer, that the adjudicated prescription claim transaction response is an approved/paid response by parsing the adjudicated prescription claim transaction response and comparing a parsed code to codes in a database or data file; and
determining, by the service provider computer, that the total amount paid is equal to or less than zero.

3. The computer-implemented method of claim 1, further comprising:
generating, by the service provider computer and based at least in part on the determination that the patient pay amount is not less than the pharmacy usual and customary charge amount, the reversal transaction to reverse the adjudicated prescription claim transaction response.

4. The computer-implemented method of claim 1, further comprising:
converting, by the service provider computer and based at least in part on the determination that the patient pay amount is not less than the pharmacy usual and customary charge amount, the adjudicated prescription claim transaction response from an approved/paid response to a rejected response.

5. The computer-implemented method of claim 1, further comprising:
comparing, by the service provider computer, the patient pay amount to the pharmacy usual and customary charge amount to determine if the patient pay amount is equal to the pharmacy usual and customary charge amount; and
determining, by the service provider computer and based at least in part on the comparison, that the patient pay amount is equal to the pharmacy usual and customary charge amount,
wherein the reversal transaction is further generated based at least in part on the determination that the patient pay amount is equal to the pharmacy usual and customary charge amount and wherein the adjudicated prescription claim transaction response is further configured based at least in part on the determination that the patient pay amount is equal to the pharmacy usual and customary charge amount.

6. An apparatus for providing feedback to a user interface of a pharmacy computer, regarding financial benefits of a cash transaction compared to a prescription claim transaction, the apparatus comprising at least one processor and at least one memory including computer program code, the at least one memory and the computer program code configured to, with the processor, cause the apparatus to at least:
receive, from a claims processor computer, and by a service provider computer associated with a service provider, an adjudicated prescription claim transaction response for the prescription claim transaction transmitted to the claims processor computer by the pharmacy computer, wherein the adjudicated prescription claim transaction response comprises a total amount paid by the pharmacy and a patient pay amount for a product/service being requested by a patient;
storing, by the service provider computer, in a routing table in the at least one memory, data indicative of the pharmacy computer from which the prescription claim transaction originated;
conduct an income audit evaluation for the prescription claim transaction by comparing the patient pay amount to a pharmacy usual and customary charge amount indicated in the prescription claim transaction to determine if the patient pay amount is less than the pharmacy usual and customary charge amount; and
in an instance it is determined the patient pay amount is not less than the pharmacy usual and customary charge amount,
transmit, by the service provider computer, a reversal transaction to the claims processor computer to reverse an adjudicated prescription claim associated with the adjudicated prescription claim transaction response;
modify, by the service provider computer, the adjudicated prescription claim transaction response to insert a message into a predetermined text field indicating a calculated sum is not less than the pharmacy usual and customary charge amount;
access the routing table to determine the pharmacy computer from which the prescription claim transaction originated; and
transmit, by the service provider computer, in real time or near real time relative to submission of the prescription claim transaction to the claims processor computer, the adjudicated prescription claim transaction response to the pharmacy computer, that when received and processed by the pharmacy computer, causes display of the message on the user interface of the pharmacy computer indicating that the pharmacy usual and customary charge amount is less than the patient pay amount provided by the pharmacy claims processor.

7. The apparatus of claim 6, wherein the at least one memory and the computer program code are further configured to cause the apparatus to, prior to conducting the income audit evaluation:
identify, by the service provider computer, the pharmacy usual and customary charge amount for the product/service being requested by the patient in the prescription claim transaction;
determine, by the service provider computer, that the adjudicated prescription claim transaction response is an approved/paid response by parsing the adjudicated prescription claim transaction response and comparing a parsed code to codes in a database or data file; and
determine, by the service provider computer, that the total amount paid is equal to or less than zero.

8. The apparatus of claim 6, wherein the at least one memory and the computer program code are further configured to cause the apparatus to:
prior to conducting the income audit evaluation, store, by the service provider computer, in a routing table on a memory device, data indicative of the pharmacy computer from which the prescription claim transaction originated; and
access the routing table to determine the pharmacy computer from which the prescription claim transaction originated.

9. The apparatus of claim 6, wherein the at least one memory and the computer program code are further configured to cause the apparatus to:

generate, by the service provider computer and based at least in part on the determination that the patient pay amount is not less than the pharmacy usual and customary charge amount, the reversal transaction to reverse the adjudicated prescription claim transaction response.

10. The apparatus of claim 6, wherein the at least one memory and the computer program code are further configured to cause the apparatus to:
convert, by the service provider computer and based at least in part on the determination that the patient pay amount is not less than the pharmacy usual and customary charge amount, the adjudicated prescription claim transaction response from an approved/paid response to a rejected response.

11. The apparatus of claim 6, wherein the at least one memory and the computer program code are further configured to cause the apparatus to:
compare, by the service provider computer, the patient pay amount to the pharmacy usual and customary charge amount to determine if the patient pay amount is equal to the pharmacy usual and customary charge amount; and
determine, by the service provider computer and based at least in part on the comparison, that the patient pay amount is equal to the pharmacy usual and customary charge amount,
wherein the reversal transaction is further generated based at least in part on the determination that the patient pay amount is equal to the pharmacy usual and customary charge amount and wherein the adjudicated prescription claim transaction response is further configured based at least in part on the determination that the patient pay amount is equal to the pharmacy usual and customary charge amount.

12. A computer program product for providing real time or near real time feedback to a user interface of a pharmacy computer, regarding financial benefits of a cash transaction compared to a prescription claim transaction, the computer program product comprising at least one non-transitory computer-readable storage medium having computer-executable program code instructions stored therein, the computer-executable program code instructions comprising program code instructions to:
receive, from a claims processor computer of a claims processor computer, and by a service provider computer associated with a service provider, an adjudicated prescription claim transaction response for the prescription claim transaction transmitted to the claims processor computer by the pharmacy computer, wherein the adjudicated prescription claim transaction response comprises a total amount paid by the pharmacy and a patient pay amount for a product/service being requested by a patient;
store, by the service provider computer, in a routing table in a memory device, data indicative of the pharmacy computer from which the prescription claim transaction originated;
conduct an income audit evaluation for the prescription claim transaction by comparing the patient pay amount to a pharmacy usual and customary charge amount indicated in the prescription claim transaction to determine if the patient pay amount is less than the pharmacy usual and customary charge amount; and
in an instance it is determined the patient pay amount is not less than the pharmacy usual and customary charge amount,
transmit, by the service provider computer, a reversal transaction to the claims processor computer to reverse an adjudicated prescription claim associated with the adjudicated prescription claim transaction response;
modify, by the service provider computer, the adjudicated prescription claim transaction response to insert a message into a predetermined text field indicating a calculated sum is not less than the pharmacy usual and customary charge amount;
access the routing table to determine the pharmacy computer from which the prescription claim transaction originated; and
transmit, by the service provider computer, in real time or near real time relative to submission of the prescription claim transaction to the claims processor computer, the adjudicated prescription claim transaction response, that when received and processed by the pharmacy computer, causes display of the message on the user interface of the pharmacy computer indicating that the pharmacy usual and customary charge amount is less than the patient pay amount provided by the claims processor computer, that when received and processed by the pharmacy computer, causes display of the message on the user interface of the pharmacy computer indicating that the pharmacy usual and customary charge amount is less than the patient pay amount provided by the pharmacy claims processor.

13. The computer program product of claim 12, wherein the computer-executable program code instructions further comprise program code instructions to, prior to conducting the income audit evaluation:
identify, by the service provider computer, the pharmacy usual and customary charge amount for the product/service being requested by the patient in the prescription claim transaction;
determine, by the service provider computer, that the adjudicated prescription claim transaction response is an approved/paid response by parsing the adjudicated prescription claim transaction response and comparing a parsed code to codes in a database or data file; and
determine, by the service provider computer, that the total amount paid is equal to or less than zero.

14. The computer program product of claim 12, wherein the computer-executable program code instructions further comprise program code instructions to:
generate, by the service provider computer and based at least in part on the determination that the patient pay amount is not less than the pharmacy usual and customary charge amount, the reversal transaction to reverse the adjudicated prescription claim transaction response.

15. The computer program product of claim 12, wherein the computer-executable program code instructions further comprise program code instructions to:
convert, by the service provider computer and based at least in part on the determination that the patient pay amount is not less than the pharmacy usual and customary charge amount, the adjudicated prescription claim transaction response from an approved/paid response to a rejected response.

16. The computer program product of claim 12, wherein the computer-executable program code instructions further comprise program code instructions to:
compare, by the service provider computer, the patient pay amount to the pharmacy usual and customary charge amount to determine if the patient pay amount is equal to the pharmacy usual and customary charge amount; and determine, by the service provider computer and based at least in part on the comparison, that the patient pay amount is equal to the pharmacy usual and customary charge amount, wherein the reversal transaction is further generated based at least in part on the determination that the patient pay amount is equal to the pharmacy usual and customary charge amount and wherein the adjudicated prescription claim transaction response is further configured based at least in part on the determination that the patient pay amount is equal to the pharmacy usual and customary charge amount.

\* \* \* \* \*